United States Patent
Adachi et al.

(10) Patent No.: US 10,928,761 B2
(45) Date of Patent: *Feb. 23, 2021

(54) IMAGE FORMATION APPARATUS INCLUDING A RESISTIVE HEAT GENERATOR DRIVEN BY A POWER CONTROL DEVICE

(71) Applicant: Ricoh Company, Ltd., Tokyo (JP)

(72) Inventors: Tomoya Adachi, Kanagawa (JP);
Yuusuke Furuichi, Kanagawa (JP);
Yukimichi Someya, Saitama (JP);
Masahiro Samei, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/352,390

(22) Filed: Mar. 13, 2019

(65) Prior Publication Data

US 2019/0286029 A1 Sep. 19, 2019

(30) Foreign Application Priority Data

Mar. 14, 2018 (JP) .............................. JP2018-046611
Mar. 7, 2019 (JP) .............................. JP2019-041226

(51) Int. Cl.
*G03G 15/20* (2006.01)
*G03G 15/00* (2006.01)

(52) U.S. Cl.
CPC ..... *G03G 15/2053* (2013.01); *G03G 15/5004* (2013.01); *G03G 2215/2035* (2013.01)

(58) Field of Classification Search
CPC ....................... G03G 15/2039; G03G 15/2053
See application file for complete search history.

(56) References Cited

U.S. PATENT DOCUMENTS

| 10,539,912 B1* | 1/2020 | Hase | ................... G03G 15/2053 |
| 2019/0041779 A1* | 2/2019 | Takagi | ............... G03G 15/2039 |

FOREIGN PATENT DOCUMENTS

| JP | 2004-226461 | 8/2004 |
| JP | 2004-246045 | 9/2004 |
| JP | 2015-194713 | 11/2015 |
| JP | 2016-018127 | 2/2016 |

* cited by examiner

*Primary Examiner* — Walter L Lindsay, Jr.
*Assistant Examiner* — Andrew V Do
(74) *Attorney, Agent, or Firm* — Oblon, McClelland, Maier & Neustadt, L.L.P.

(57) ABSTRACT

An image forming apparatus includes a resistive heat generator and a power control device that controls power supplied to the resistive heat generator. The power control device supplies the power at a predetermined power duty cycle for adjustment to the resistive heat generator. The power control device adjusts a power duty cycle when the resistive heat generator is used.

14 Claims, 20 Drawing Sheets

IMAGE FORMATION APPARATUS INCLUDING A RESISTIVE HEAT GENERATOR DRIVEN BY A POWER CONTROL DEVICE

CROSS-REFERENCE TO RELATED APPLICATIONS

This patent application is based on and claims priority pursuant to 35 U.S.C. § 119(a) to Japanese Patent Application Nos. 2018-046611, filed on Mar. 14, 2018, and 2019-041226, filed on Mar. 7, 2019, in the Japan Patent Office, the entire disclosure of each of which is hereby incorporated by reference herein.

BACKGROUND

Technical Field

Exemplary aspects of the present disclosure relate to an image forming apparatus, and more particularly, to an image forming apparatus that forms an image on a recording medium.

Discussion of the Background Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data by electrophotography.

Such image forming apparatuses employ fixing devices of various types to fix the image on the recording medium. As one example, the fixing device includes a fixing belt that is thin and has a decreased thermal capacity and a heater constructed of a base and a resistive heat generator. The heater heats the fixing belt. The base of the heater extends in an axial direction of the fixing belt. The resistive heat generator is disposed on the base.

The resistive heat generator is generally produced by printing a heat generating pattern made of a resistive heat generating material on a surface of the base such as a ceramic board by screen printing. The resistive heat generating material may suffer from variation in resistance. Additionally, the heat generating pattern may suffer from variation in line width and thickness due to screen printing, resulting in variation in resistance. Accordingly, the resistive heat generator may suffer from substantial variation in total resistance value.

SUMMARY

This specification describes below an improved image forming apparatus. In one embodiment, the image forming apparatus includes a resistive heat generator and a power control device that controls power supplied to the resistive heat generator. The power control device supplies the power at a predetermined power duty cycle for adjustment to the resistive heat generator. The power control device adjusts a power duty cycle when the resistive heat generator is used.

This specification further describes an improved image forming apparatus. In one embodiment, the image forming apparatus includes a first fixing device including a first resistive heat generator and a second fixing device including a second resistive heat generator. The second fixing device replaces the first fixing device. A power supply device supplies power to one of the first fixing device and the second fixing device, that is installed in the image forming apparatus. The power supply device controls a first resistance value of the first resistive heat generator to be greater than a second resistance value of the second resistive heat generator. The power supply device controls a first power duty cycle of the power supplied when the first fixing device is installed in the image forming apparatus to be greater than a second power duty cycle of the power supplied when the second fixing device is installed in the image forming apparatus.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1A:
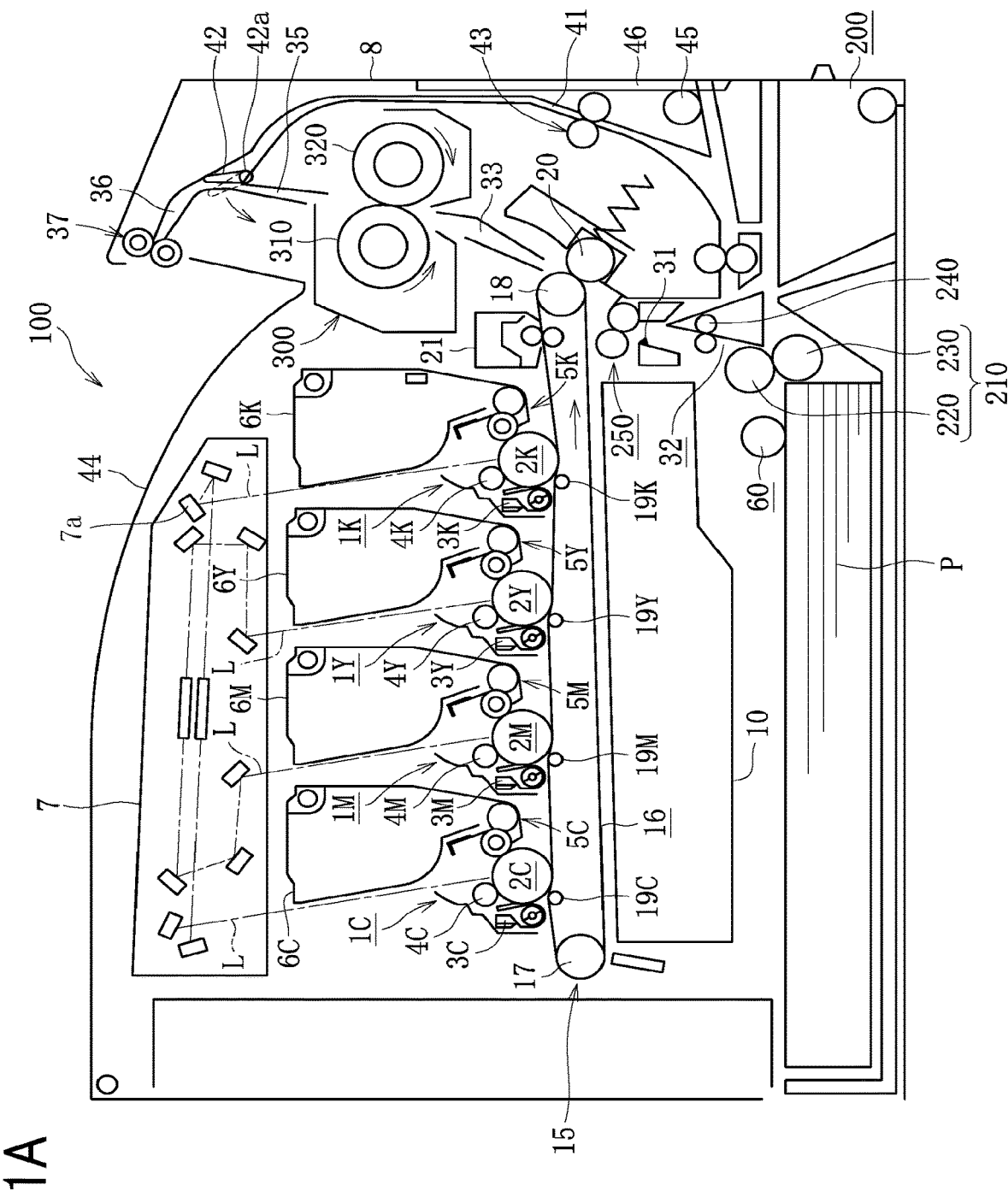
FIG. 1A is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Referring to drawings, a description is provided of a construction of a heater, a fixing device incorporating the heater, and an image forming apparatus (e.g., a laser printer) incorporating the fixing device according to embodiments of the present disclosure.

A laser printer is one example of the image forming apparatus. The image forming apparatus is not limited to the laser printer. For example, the image forming apparatus may be a copier, a facsimile machine, a printer, a printing machine, an inkjet recording apparatus, or a multifunction peripheral (MFP) having at least two of copying, facsimile, printing, scanning, and inkjet recording functions.

In the drawings, identical reference numerals are assigned to identical elements and equivalents and redundant descriptions of the identical elements and the equivalents are summarized or omitted properly. The dimension, material, shape, relative position, and the like of each of the elements are examples and do not limit the scope of this disclosure unless otherwise specified.

According to the embodiments below, a sheet is used as a recording medium. However, the recording medium is not limited to paper as the sheet. In addition to paper as the sheet, the recording medium includes an OHP (overhead projector) transparency, cloth, a metal sheet, plastic film, and a prepreg sheet pre-impregnated with resin in carbon fiber.

The recording medium also includes a medium adhered with a developer and ink, recording paper, and a recording sheet. The sheet includes plain paper, thick paper, a postcard, an envelope, thin paper, coated paper, art paper, and tracing paper.

Image formation described below denotes forming an image having meaning such as characters and figures and an image not having meaning such as patterns on the medium.

A description is provided of a construction of a laser printer as an image forming apparatus 100.

Figure 1B:
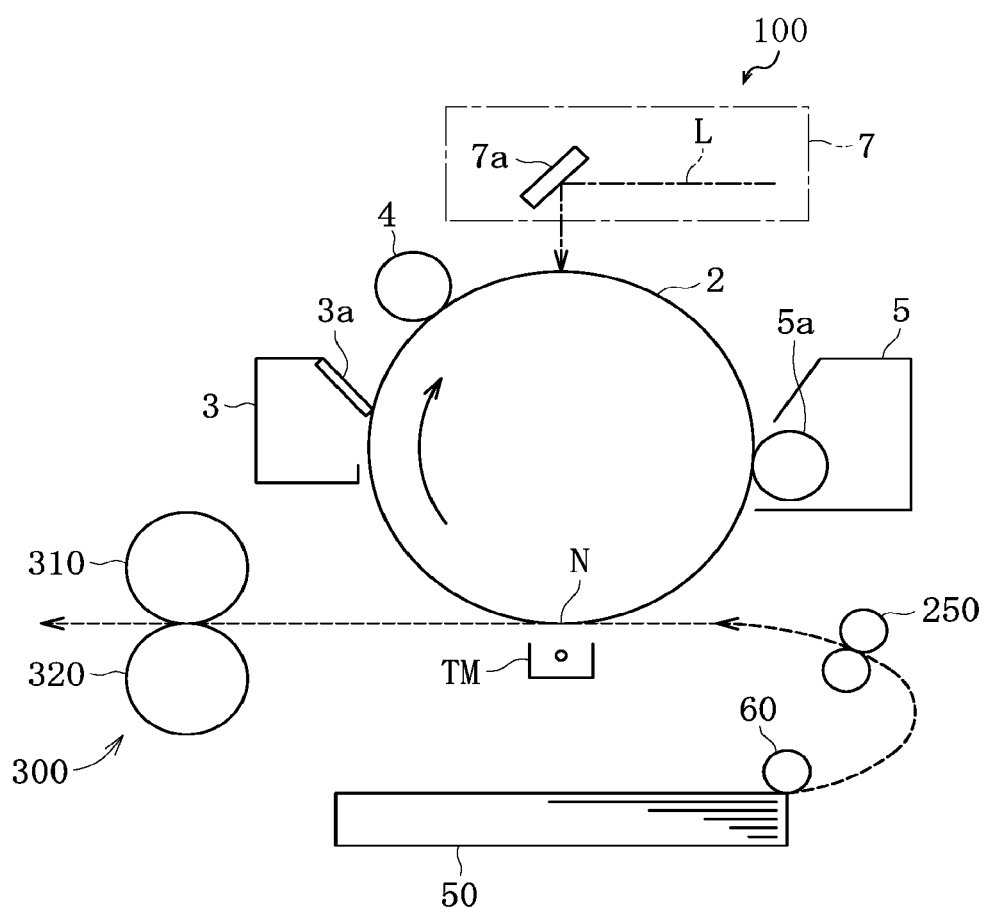
FIG. 1B is a schematic cross-sectional view of the image forming apparatus depicted in FIG. 1A, illustrating and simplifying a mechanism thereof.
Figure 1C:
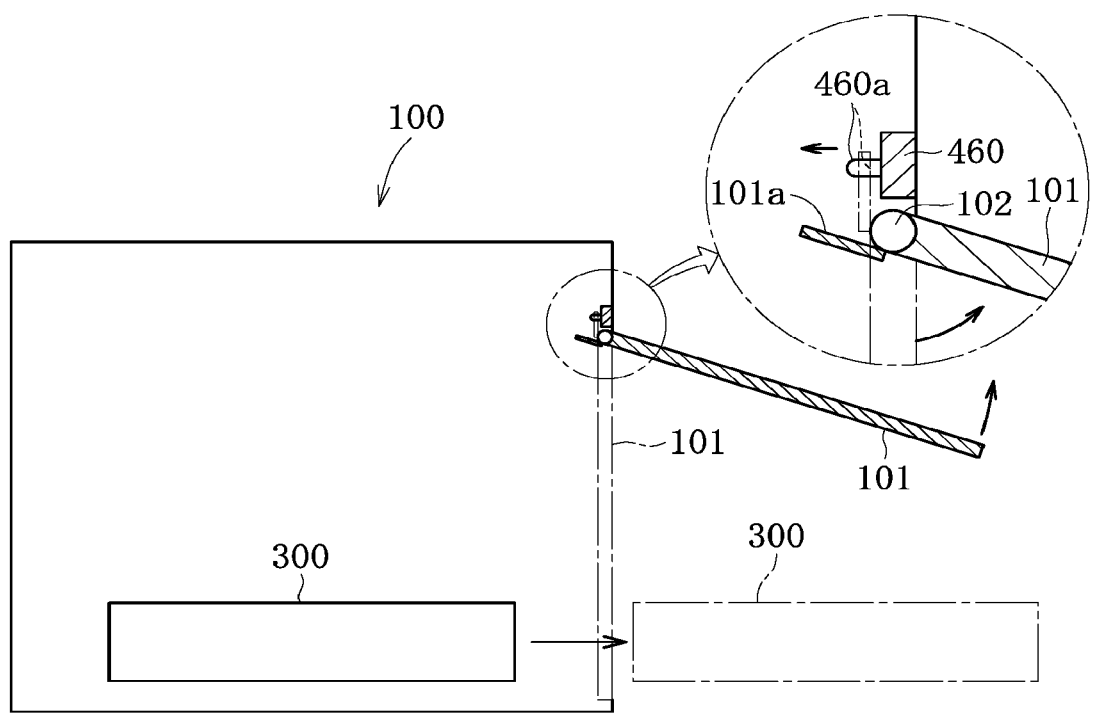
FIG. 1C is a plan view of the image forming apparatus depicted in FIG. 1A, illustrating removal of a fixing device incorporated therein.

FIG. 1A is a schematic cross-sectional view of the image forming apparatus 100 that incorporates the heater or a fixing device 300 according to the embodiments of the present disclosure. FIG. 1A schematically illustrates a construction of a color laser printer as one embodiment of the image forming apparatus 100. FIG. 1B is a schematic cross-sectional view of the image forming apparatus 100, illustrating and simplifying a principle or a mechanism of the color laser printer. FIG. 1C is a plan view of the image forming apparatus 100, illustrating removal of the fixing device 300.

As illustrated in FIG. 1A, the image forming apparatus 100 includes four process units 1K, 1Y, 1M, and 1C serving as image forming devices, respectively. The process units 1K, 1Y, 1M, and 1C form black, yellow, magenta, and cyan toner images with developers in black (K), yellow (Y), magenta (M), and cyan (C), respectively, which correspond to color separation components for a color image.

The process units 1K, 1Y, 1M, and 1C have a common construction except that the process units 1K, 1Y, 1M, and 1C include toner bottles 6K, 6Y, 6M, and 6C containing fresh toners in different colors, respectively. Hence, the following describes a construction of a single process unit, that is, the process unit 1K, and a description of a construction of each of other process units, that is, the process units 1Y, 1M, and 1C, is omitted.

The process unit 1K includes an image bearer 2K (e.g., a photoconductive drum), a drum cleaner 3K, and a discharger. The process unit 1K further includes a charger 4K and a developing device 5K. The charger 4K serves as a charging member or a charging device that uniformly charges a surface of the image bearer 2K. The developing device 5K serves as a developing member that develops an electrostatic latent image formed on the image bearer 2K into a visible image. The process unit 1K is detachably attached to a body of the image forming apparatus 100 to replace consumables of the process unit 1K with new ones. Similarly, the process units 1Y, 1M, and 1C include image bearers 2Y, 2M, and 2C, drum cleaners 3Y, 3M, and 3C, chargers 4Y, 4M, and 4C, and developing devices 5Y, 5M, and 5C, respectively. In FIG. 1B, the image bearers 2K, 2Y, 2M, and 2C, the drum cleaners 3K, 3Y, 3M, and 3C, the chargers 4K, 4Y, 4M, and 4C, and the developing devices 5K, 5Y, 5M, and 5C are indicated as an image bearer 2, a drum cleaner 3, a charger 4, and a developing device 5, respectively.

An exposure device 7 is disposed above the process units 1K, 1Y, 1M, and 1C disposed inside the image forming apparatus 100. The exposure device 7 performs scanning and writing according to image data. For example, the exposure device 7 includes a laser diode that emits a laser beam L according to the image data and a mirror 7a that reflects the laser beam L to the image bearer 2K so that the laser beam L irradiates the image bearer 2K.

According to this embodiment, a transfer device 15 is disposed below the process units 1K, 1Y, 1M, and 1C. The transfer device 15 is equivalent to a transferor TM depicted in FIG. 1B. Primary transfer rollers 19K, 19Y, 19M, and 19C are disposed opposite the image bearers 2K, 2Y, 2M, and 2C, respectively, and in contact with an intermediate transfer belt 16.

The intermediate transfer belt 16 rotates in a state in which the intermediate transfer belt 16 is looped over the primary transfer rollers 19K, 19Y, 19M, and 19C, a driving roller 18, and a driven roller 17. A secondary transfer roller 20 is disposed opposite the driving roller 18 and in contact with the intermediate transfer belt 16. The image bearers 2K, 2Y, 2M, and 2C serve as primary image bearers that bear black, yellow, magenta, and cyan toner images, respectively. The intermediate transfer belt 16 serves as a secondary image bearer that bears a composite toner image (e.g., a color toner image) formed with the black, yellow, magenta, and cyan toner images.

A belt cleaner 21 is disposed downstream from the secondary transfer roller 20 in a rotation direction of the intermediate transfer belt 16. A cleaning backup roller is disposed opposite the belt cleaner 21 via the intermediate transfer belt 16.

A sheet feeder 200 including a tray 50 depicted in FIG. 1B that loads sheets P is disposed in a lower portion of the image forming apparatus 100. The sheet feeder 200 serves as a recording medium supply that contains a sheaf of sheets P serving as recording media. The sheet feeder 200 is combined with a sheet feeding roller 60 and a roller pair 210, serving as separation-conveyance members that separate an uppermost sheet P from other sheets P and convey the uppermost sheet P, into a unit.

The sheet feeder 200 is inserted into and removed from the body of the image forming apparatus 100 for replenishment of the sheets P and the like. The sheet feeding roller 60 and the roller pair 210 are disposed above the sheet feeder 200 and convey the uppermost sheet P of the sheaf of sheets P placed in the sheet feeder 200 toward a sheet feeding path 32.

A registration roller pair 250 serving as a conveyer is disposed immediately upstream from the secondary transfer roller 20 in a sheet conveyance direction. The registration roller pair 250 temporarily halts the sheet P sent from the sheet feeder 200. As the registration roller pair 250 temporarily halts the sheet P, the registration roller pair 250 slacks a leading end of the sheet P, correcting skew of the sheet P.

A registration sensor 31 is disposed immediately upstream from the registration roller pair 250 in the sheet conveyance direction. The registration sensor 31 detects passage of the leading end of the sheet P. When a predetermined time period elapses after the registration sensor 31 detects passage of the leading end of the sheet P, the sheet P strikes the registration roller pair 250 and halts temporarily.

Downstream from the sheet feeder 200 in the sheet conveyance direction is a conveying roller 240 that conveys the sheet P conveyed rightward from the roller pair 210 upward. As illustrated in FIG. 1A, the conveying roller 240 conveys the sheet P upward toward the registration roller pair 250.

The roller pair 210 is constructed of a pair of rollers, that is, an upper roller and a lower roller. The roller pair 210 employs a friction reverse roller (FRR) separation system or a friction roller (FR) separation system. According to the FRR separation system, a separating roller (e.g., a reverse roller) is applied with a torque in a predetermined amount in an anti-feeding direction by a driving shaft through a torque limiter. The separating roller is pressed against a feeding roller to form a nip therebetween where the uppermost sheet P is separated from other sheets P. According to the FR separation system, a separating roller (e.g., a friction roller) is supported by a securing shaft via a torque limiter. The separating roller is pressed against a feeding roller to form a nip therebetween where the uppermost sheet P is separated from other sheets P.

According to this embodiment, the roller pair 210 employs the FRR separation system. For example, the roller pair 210 includes a feeding roller 220 and a separating roller 230. The feeding roller 220 is an upper roller that conveys the sheet P to an inside of a machine. The separating roller 230 is a lower roller that is applied with a driving force in a direction opposite a rotation direction of the feeding roller 220 by a driving shaft through a torque limiter.

A biasing member such as a spring biases the separating roller 230 against the feeding roller 220. The driving force applied to the feeding roller 220 is transmitted to the sheet feeding roller 60 through a clutch, thus rotating the sheet feeding roller 60 counterclockwise in FIG. 1A.

After the leading end of the sheet P strikes the registration roller pair 250 and slacks, the registration roller pair 250 conveys the sheet P to a secondary transfer nip (e.g., a transfer nip N depicted in FIG. 1B) formed between the secondary transfer roller 20 and the intermediate transfer belt 16 at a proper time when the secondary transfer roller 20 transfers a color toner image formed on the intermediate transfer belt 16 onto the sheet P. A bias applied at the secondary transfer nip electrostatically transfers the color toner image formed on the intermediate transfer belt 16 onto a desired transfer position on the sheet P sent to the secondary transfer nip precisely.

Figure 2A:
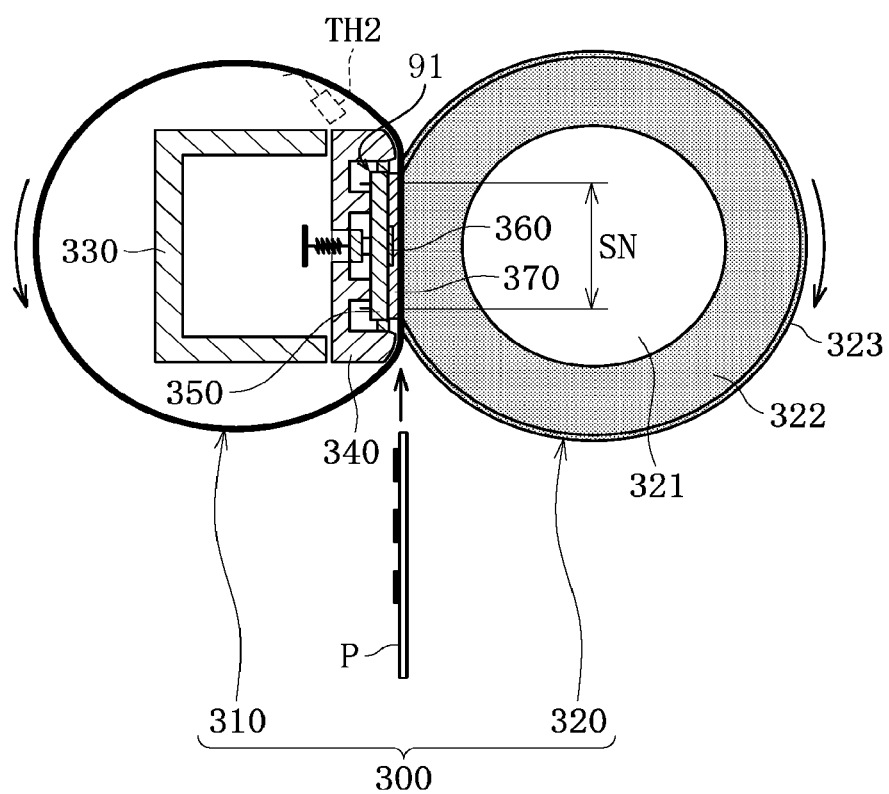
FIG. 2A is a cross-sectional view of the fixing device according to a first embodiment of the present disclosure, which is incorporated in the image forming apparatus depicted in FIG. 1A, illustrating a heater incorporated in the fixing device.
Figure 2B:
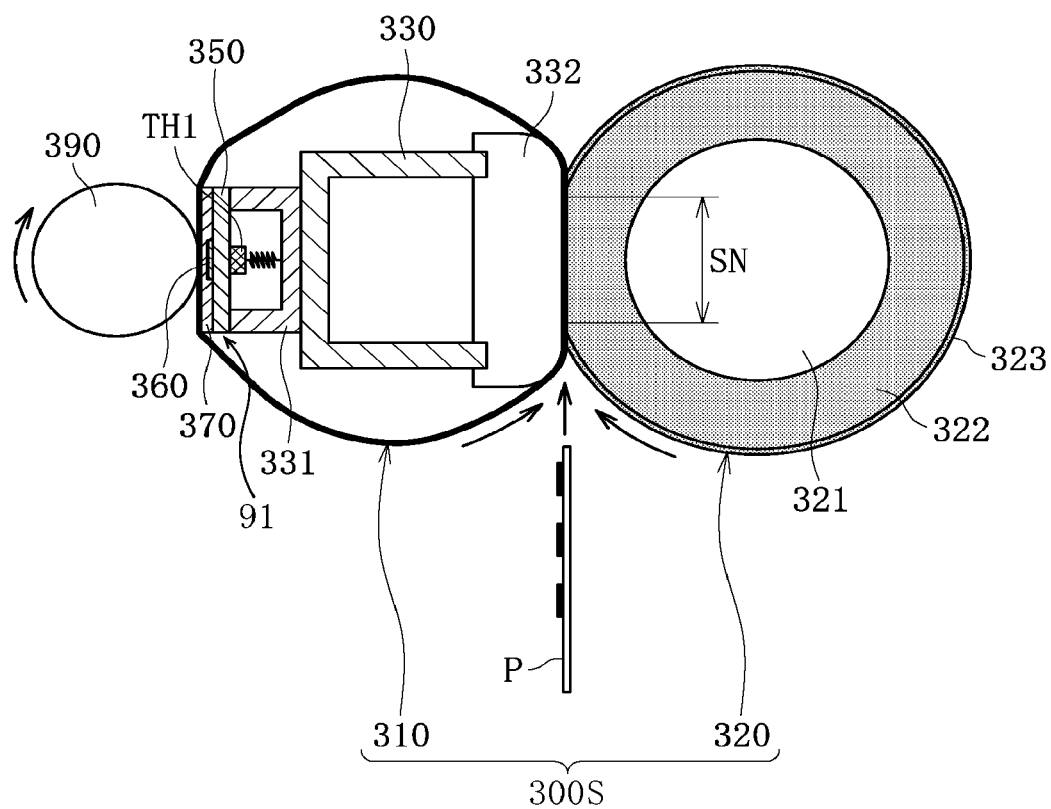
FIG. 2B is a cross-sectional view of a fixing device according to a second embodiment of the present disclosure, which is installable in the image forming apparatus depicted in FIG. 1A.
Figure 2C:
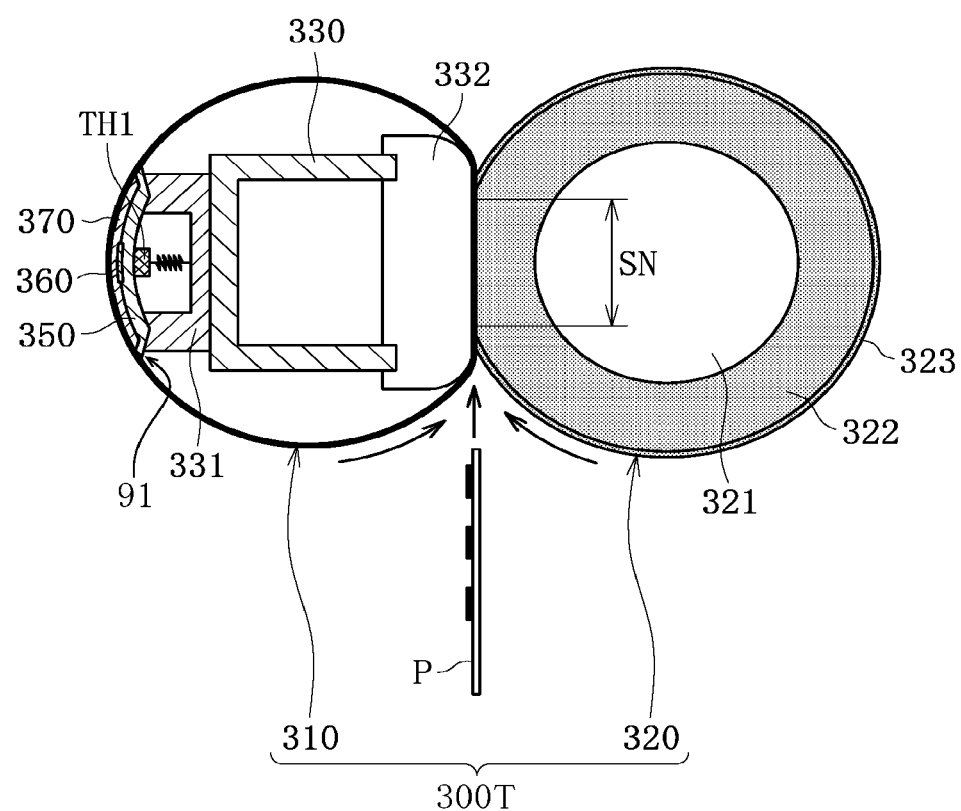
FIG. 2C is a cross-sectional view of a fixing device according to a third embodiment of the present disclosure, which is installable in the image forming apparatus depicted in FIG. 1A.
Figure 2D:
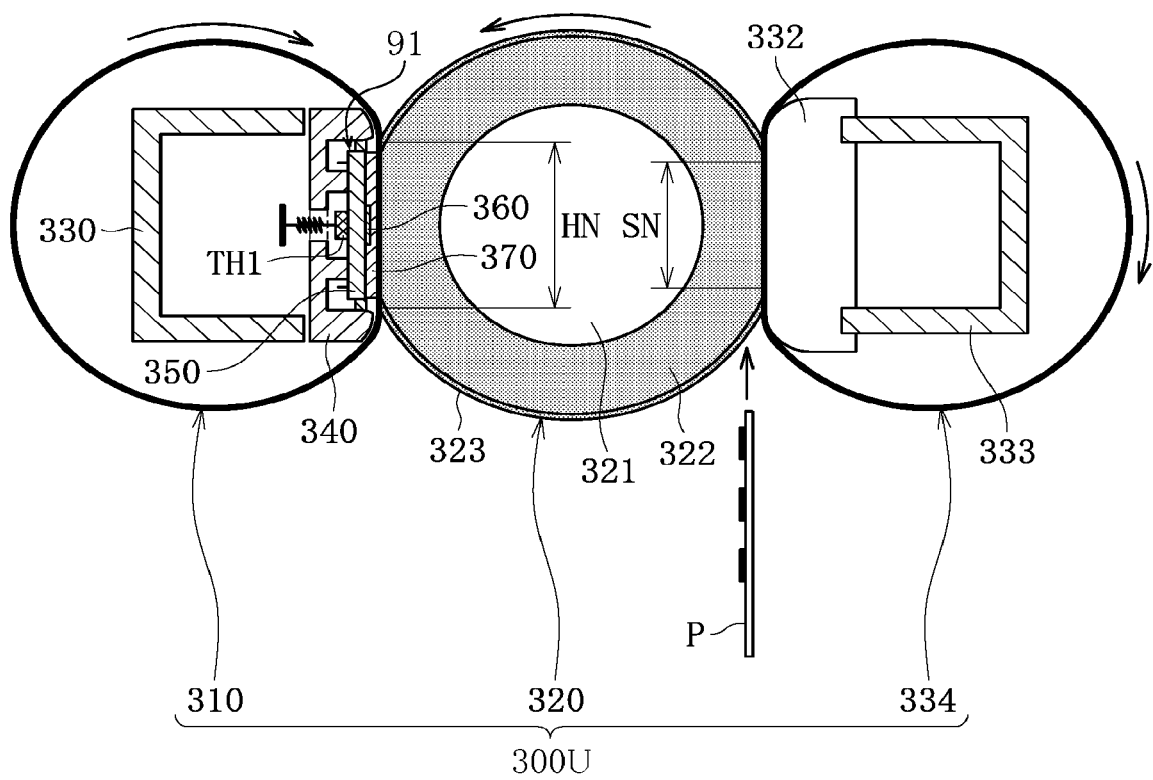
FIG. 2D is a cross-sectional view of a fixing device according to a fourth embodiment of the present disclosure, which is installable in the image forming apparatus depicted in FIG. 1A.

A post-transfer conveyance path 33 is disposed above the secondary transfer nip formed between the secondary transfer roller 20 and the intermediate transfer belt 16. The fixing device 300 is disposed in proximity to an upper end of the post-transfer conveyance path 33. The fixing device 300 includes a fixing belt 310 and a pressure roller 320. The fixing belt 310 accommodates the heater. The pressure roller 320, serving as a pressure rotator or a pressure member, rotates while the pressure roller 320 contacts the fixing belt 310 with predetermined pressure. The fixing device 300 has a construction depicted in FIG. 2A. FIG. 2A is a cross-sectional view of the fixing device 300 according to a first embodiment. Alternatively, the fixing device 300 may be replaced by fixing devices 300S, 300T, and 300U that have constructions described below with reference to FIGS. 2B, 2C, and 2D, respectively. FIG. 2B is a cross-sectional view of the fixing device 300S according to a second embodiment. FIG. 2C is a cross-sectional view of the fixing device 300T according to a third embodiment. FIG. 2D is a cross-sectional view of the fixing device 300U according to a fourth embodiment.

As illustrated in FIG. 1A, a post-fixing conveyance path 35 is disposed above the fixing device 300. At an upper end of the post-fixing conveyance path 35, the post-fixing conveyance path 35 branches to a sheet ejection path 36 and a reverse conveyance path 41. A switcher 42 is disposed at a bifurcation of the post-fixing conveyance path 35. The switcher 42 pivots about a pivot shaft 42a as an axis. A sheet ejection roller pair 37 is disposed in proximity to an outlet edge of the sheet ejection path 36.

One end of the reverse conveyance path 41 is at the bifurcation of the post-fixing conveyance path 35. Another end of the reverse conveyance path 41 joins the sheet feeding path 32. A reverse conveyance roller pair 43 is disposed in a middle of the reverse conveyance path 41. A sheet ejection tray 44 is disposed in an upper portion of the image forming apparatus 100. The sheet ejection tray 44 includes a recess directed inward in the image forming apparatus 100.

A powder container 10 (e.g., a toner container) is interposed between the transfer device 15 and the sheet feeder 200. The powder container 10 is detachably attached to the body of the image forming apparatus 100.

The image forming apparatus 100 according to this embodiment secures a predetermined distance from the sheet feeding roller 60 to the secondary transfer roller 20 to convey the sheet P. Hence, the powder container 10 is situated in a dead space defined by the predetermined distance, downsizing the image forming apparatus 100 entirely.

A transfer cover 8 is disposed above the sheet feeder 200 at a front of the image forming apparatus 100 in a drawing direction of the sheet feeder 200. As an operator (e.g., a user and a service engineer) opens the transfer cover 8, the operator inspects an inside of the image forming apparatus 100. The transfer cover 8 mounts a bypass tray 46 and a bypass sheet feeding roller 45 used for a sheet P manually placed on the bypass tray 46 by the operator.

A description is provided of a configuration of a side cover 101 of the image forming apparatus 100.

FIG. 1C is a plan view of the image forming apparatus 100, illustrating a method for removing the fixing device 300 from the image forming apparatus 100. The fixing device 300 installed in the image forming apparatus 100 may be replaced with new one due to the end of the life of the fixing device 300, failure, other errors, and the like.

As illustrated in FIG. 1C, the side cover 101 serving as an exterior member is attached to a side of the body of the image forming apparatus 100. The operator opens and closes the side cover 101 for maintenance or the like. When the operator removes the fixing device 300, the operator pivots the side cover 101 about a pivot shaft 102 to open the side cover 101 outward and moves and slides the fixing device 300 outward in a direction indicated by an arrow in FIG. 1C.

If the image forming apparatus 100 is configured to allow the user who purchases the new fixing device 300 to replace the used fixing device 300 with the new fixing device 300, the fixing device 300 generally includes a new product detection mechanism. When the user replaces the used fixing device 300 with the new fixing device 300, a detector disposed inside the image forming apparatus 100 detects that the new fixing device 300 is installed, causing the image forming apparatus 100 to reset a life counter for continuous use automatically.

An electric current fuse or a temperature fuse is generally used for the image forming apparatus 100 to detect a new product. For example, when a used part is replaced with a new replacement part, since the detector of the image forming apparatus 100 detects that the replacement part is new, the electric current fuse or the temperature fuse is installed inside the replacement part.

As the detector disposed in the body of the image forming apparatus 100 detects connection (e.g., non-fusing) of the electric current fuse or the temperature fuse, the detector detects that the replacement part is new and resets a print page counter, that is, a preventive maintenance counter. For example, the image forming apparatus 100 performs preventive maintenance counting upon detection of the new replacement part.

Subsequently to preventive maintenance counting, the electric current fuse or the temperature fuse is fused under power and heat. Thereafter, since the electric current fuse or the temperature fuse for the replacement part has been fused and nonconductive, the image forming apparatus 100 recognizes that the replacement part is used. As the electric current fuse or the temperature fuse is installed in the fixing device 300, when the fixing device 300 is replaced with new one, the detector disposed inside the body of the image forming apparatus 100 detects that the fixing device 300 is new. Thereafter, supply of a power duty cycle for adjustment starts automatically in step S32 illustrated in FIG. 6D described below.

As illustrated in FIG. 1C, according to this embodiment, a detector 460 abuts on the pivot shaft 102 for the side cover 101, about which the side cover 101 pivots to open and close. The detector 460 includes a plunger 460a and a limit switch actuated by the plunger 460a. While the side cover 101 closes, as a pressing piece 101a coupled to the pivot shaft 102 presses the plunger 460a against a spring, the limit switch is turned off. Conversely, as illustrated in FIG. 1C, as the operator opens the side cover 101 and the pressing piece 101a releases pressure exerted to the plunger 460a, the limit switch is turned on.

When the operator installs and removes the fixing device 300 into and from the body of the image forming apparatus 100, the operator opens and closes the side cover 101. Hence, as a trigger signal to start detecting the new fixing device 300 with the electric current fuse or the temperature fuse as described above, turning on and off of the detector 460 is used. A trigger signal is sent to the triac 420 under an identical condition described below with fixing devices A and B.

As illustrated in FIG. 2A, the fixing device 300 includes a heat generator 360. If the heat generator 360 suffers from disconnection, the fixing device 300 is replaced with new one as described above. Alternatively, the heat generator 360 may be replaced with new one. In this case, the service engineer, not the user, usually replaces the heat generator 360 with new one.

When the service engineer replaces the heat generator 360 also, a detector for detecting that the heat generator 360 is removed and replaced with new one is employed to start supplying power at the power duty cycle for adjustment automatically like a case in which the fixing device 300 is replaced with new one. For example, the detector includes a new product detection contact between a holder 340 and the heat generator 360 depicted in FIG. 2A.

For example, the operator removes the used heat generator 360 that suffers from disconnection from the holder 340 and attaches the new heat generator 360 to the holder 340 subsequently, thus opening and closing the new product detection contact. As the detector disposed inside the body of the image forming apparatus 100 detects opening and closing of the new product detection contact, replacement of the heat generator 360 with new one is recognized.

A description is provided of operations of the image forming apparatus 100, that is, the laser printer.

Referring to FIG. 1A, the following describes basic operations of the image forming apparatus 100 according to this embodiment, which has the construction described above to perform image formation.

First, a description is provided of operations of the image forming apparatus 100 to print on one side of a sheet P.

As illustrated in FIG. 1A, the sheet feeding roller 60 rotates according to a sheet feeding signal sent from a controller of the image forming apparatus 100. The sheet feeding roller 60 separates an uppermost sheet P from other sheets P of a sheaf of sheets P loaded in the sheet feeder 200 and feeds the uppermost sheet P to the sheet feeding path 32.

When the leading end of the sheet P sent by the sheet feeding roller 60 and the roller pair 210 reaches a nip of the registration roller pair 250, the registration roller pair 250 slacks the sheet P and halts the sheet P temporarily. The registration roller pair 250 conveys the sheet P to the secondary transfer nip at an optimal time in synchronism with a time when the secondary transfer roller 20 transfers a color toner image formed on the intermediate transfer belt 16 onto the sheet P while the registration roller pair 250 corrects skew of the leading end of the sheet P.

In order to feed a sheaf of sheets P placed on the bypass tray 46, the bypass sheet feeding roller 45 conveys the sheaf of sheets P loaded on the bypass tray 46 one by one from an uppermost sheet P. The sheet P is conveyed through a part of the reverse conveyance path 41 to the nip of the registration roller pair 250. Thereafter, the sheet P is conveyed similarly to the sheet P conveyed from the sheet feeder 200.

The following describes processes for image formation with one process unit, that is, the process unit 1K, and a description of processes for image formation with other process units, that is, the process units 1Y, 1M, and 1C, is omitted. First, the charger 4K uniformly charges the surface of the image bearer 2K at a high electric potential. The exposure device 7 emits a laser beam L that irradiates the surface of the image bearer 2K according to image data.

The electric potential of an irradiated portion on the surface of the image bearer 2K, which is irradiated with the laser beam L, decreases, forming an electrostatic latent image on the image bearer 2K. The developing device 5K includes a developer bearer 5a depicted in FIG. 1B that bears a developer containing toner. Fresh black toner supplied from the toner bottle 6K is transferred onto a portion on the surface of the image bearer 2K, which bears the electrostatic latent image, through the developer bearer 5a.

The surface of the image bearer 2K transferred with the toner bears a black toner image developed with the black toner. The primary transfer roller 19K transfers the black toner image formed on the image bearer 2K onto the intermediate transfer belt 16.

A cleaning blade 3a depicted in FIG. 1B of the drum cleaner 3K removes residual toner failed to be transferred onto the intermediate transfer belt 16 and therefore adhered on the surface of the image bearer 2K therefrom. The removed residual toner is conveyed by a waste toner conveyer and collected into a waste toner container disposed inside the process unit 1K. The discharger removes residual electric charge from the image bearer 2K from which the drum cleaner 3K has removed the residual toner.

Similarly, in the process units 1Y, 1M, and 1C, yellow, magenta, and cyan toner images are formed on the image bearers 2Y, 2M, and 2C, respectively. The primary transfer rollers 19Y, 19M, and 19C transfer the yellow, magenta, and cyan toner images formed on the image bearers 2Y, 2M, and 2C, respectively, onto the intermediate transfer belt 16 such that the yellow, magenta, and cyan toner images are superimposed on the intermediate transfer belt 16.

The black, yellow, magenta, and cyan toner images transferred and superimposed on the intermediate transfer belt 16 travel to the secondary transfer nip formed between the secondary transfer roller 20 and the intermediate transfer belt 16. On the other hand, the registration roller pair 250 resumes rotation at a predetermined time while sandwiching a sheet P that strikes the registration roller pair 250. The registration roller pair 250 conveys the sheet P to the secondary transfer nip formed between the secondary transfer roller 20 and the intermediate transfer belt 16 at a time when the secondary transfer roller 20 transfers the black, yellow, magenta, and cyan toner images superimposed on the intermediate transfer belt 16 properly. Thus, the secondary transfer roller 20 transfers the black, yellow, magenta, and cyan toner images superimposed on the intermediate transfer belt 16 onto the sheet P conveyed by the registration roller pair 250, forming a color toner image on the sheet P.

The sheet P transferred with the color toner image is conveyed to the fixing device 300 through the post-transfer conveyance path 33. The fixing belt 310 and the pressure roller 320 sandwich the sheet P conveyed to the fixing device 300 and fix the unfixed color toner image on the sheet P under heat and pressure. The sheet P bearing the fixed color toner image is conveyed from the fixing device 300 to the post-fixing conveyance path 35.

When the sheet P is sent out of the fixing device 300, the switcher 42 opens the upper end of the post-fixing conveyance path 35 and a vicinity thereof as illustrated with a solid line in FIG. A. The sheet P sent out of the fixing device 300 is conveyed to the sheet ejection path 36 through the post-fixing conveyance path 35. The sheet ejection roller pair 37 sandwiches the sheet P sent to the sheet ejection path 36 and is driven and rotated to eject the sheet P onto the sheet ejection tray 44, thus finishing printing on one side of the sheet P.

Next, a description is provided of operations of the image forming apparatus 100 to perform duplex printing.

Similarly to printing on one side of the sheet P, the fixing device 300 sends out the sheet P to the sheet ejection path 36. In order to perform duplex printing, the sheet ejection roller pair 37 is driven and rotated to convey a part of the sheet P to an outside of the image forming apparatus 100.

When a trailing end of the sheet P has passed through the sheet ejection path 36, the switcher 42 pivots about the pivot shaft 42a as illustrated with a dotted line in FIG. 1A, closing the upper end of the post-fixing conveyance path 35. Approximately simultaneously with closing of the upper end of the post-fixing conveyance path 35, the sheet ejection roller pair 37 rotates in a direction opposite a direction in which the sheet ejection roller pair 37 conveys the sheet P onto the outside of the image forming apparatus 100, thus conveying the sheet P to the reverse conveyance path 41.

The sheet P conveyed to the reverse conveyance path 41 travels to the registration roller pair 250 through the reverse conveyance roller pair 43. The registration roller pair 250 conveys the sheet P to the secondary transfer nip at a proper time when the secondary transfer roller 20 transfers black, yellow, magenta, and cyan toner images superimposed on the intermediate transfer belt 16 onto a back side of the sheet P, which is transferred with no toner image, that is, in synchronism with reaching of the black, yellow, magenta, and cyan toner images to the secondary transfer nip.

While the sheet P passes through the secondary transfer nip, the secondary transfer roller 20 and the driving roller 18 transfer the black, yellow, magenta, and cyan toner images onto the back side of the sheet P, which is transferred with no toner image, thus forming a color toner image on the sheet P. The sheet P transferred with the color toner image is conveyed to the fixing device 300 through the post-transfer conveyance path 33.

In the fixing device 300, the fixing belt 310 and the pressure roller 320 sandwich the sheet P conveyed to the fixing device 300 and fix the unfixed color toner image on the back side of the sheet P under heat and pressure. The sheet P bearing the color toner image fixed on both sides, that is, a front side and the back side, of the sheet P is conveyed from the fixing device 300 to the post-fixing conveyance path 35.

When the sheet P is sent out of the fixing device 300, the switcher 42 opens the upper end of the post-fixing conveyance path 35 and the vicinity thereof as illustrated with the solid line in FIG. 1A. The sheet P sent out of the fixing device 300 is conveyed to the sheet ejection path 36 through the post-fixing conveyance path 35. The sheet ejection roller pair 37 sandwiches the sheet P sent to the sheet ejection path 36 and is driven and rotated to eject the sheet P onto the sheet ejection tray 44, thus finishing duplex printing on the sheet P.

After the secondary transfer roller 20 transfers the black, yellow, magenta, and cyan toner images superimposed on the intermediate transfer belt 16 onto the sheet P, residual toner adheres to the intermediate transfer belt 16. The belt cleaner 21 removes the residual toner from the intermediate transfer belt 16. The residual toner removed from the intermediate transfer belt 16 is conveyed by the waste toner conveyer and collected into the powder container 10.

A description is provided of a construction of each of a heater 91 and the fixing devices 300, 300S, 300T, and 300U according to the first embodiment, the second embodiment, the third embodiment, and the fourth embodiment, respectively, of the present disclosure.

The following describes the construction of the heater 91 of the fixing device 300 according to the first embodiment, which is also installable in the fixing devices 300S, 300T, and 300U. As illustrated in FIG. 2A, the heater 91 heats the fixing belt 310 of the fixing device 300.

As illustrated in FIG. 2A, the fixing device 300 according to the first embodiment includes the fixing belt 310 that is thin and has a decreased thermal capacity and the pressure roller 320. For example, the fixing belt 310 includes a tubular base that is made of polyimide (PI) and has an outer diameter of 25 mm and a thickness in a range of from 40 micrometers to 120 micrometers.

The fixing belt 310 further includes a release layer serving as an outermost surface layer. The release layer is made of fluororesin, such as tetrafluoroethylene-perfluoroalkylvinylether copolymer (PFA) and polytetrafluoroethylene (PTFE), and has a thickness in a range of from 5 micrometers to 50 micrometers to enhance durability of the fixing belt 310 and facilitate separation of the sheet P and a foreign substance from the fixing belt 310. Optionally, an elastic layer that is made of rubber or the like and has a thickness in a range of from 50 micrometers to 500 micrometers may be interposed between the base and the release layer.

The base of the fixing belt 310 may be made of heat resistant resin such as polyetheretherketone (PEEK) or metal such as nickel (Ni) and SUS stainless steel, instead of polyimide. An inner circumferential surface of the fixing belt 310 may be coated with polyimide, PTFE, or the like to produce a slide layer.

The pressure roller 320 has an outer diameter of 25 mm, for example. The pressure roller 320 includes a cored bar 321, an elastic layer 322, and a release layer 323. The cored bar 321 is solid and made of metal such as iron. The elastic layer 322 coats the cored bar 321. The release layer 323 coats an outer surface of the elastic layer 322. The elastic layer 322 is made of silicone rubber and has a thickness of 3.5 mm, for example. In order to facilitate separation of the sheet P and the foreign substance from the pressure roller 320, the release layer 323 that is made of fluororesin and has a thickness of about 40 micrometers, for example, is preferably disposed on the outer surface of the elastic layer 322. A biasing member presses the pressure roller 320 against the fixing belt 310.

A stay 330 and the holder 340 are disposed inside a loop formed by the fixing belt 310 and extended in an axial direction of the fixing belt 310. The stay 330 includes a channel made of metal. Both lateral ends of the stay 330 in a longitudinal direction thereof are supported by side plates of the heater 91, respectively. The stay 330 receives pressure from the pressure roller 320 precisely to form a fixing nip SN stably.

The holder 340 holds a base 350 of the heater 91 and is supported by the stay 330. The holder 340 is preferably made of heat resistant resin having a decreased thermal conductivity, such as liquid crystal polymer (LCP). Accordingly, the holder 340 reduces conduction of heat thereto, improving heating of the fixing belt 310.

In order to prevent contact with a high temperature portion of the base 350, the holder 340 has a shape that allows the holder 340 to support the base 350 at two positions in proximity to both ends of the base 350, respectively, in a short direction thereof. Accordingly, the holder 340 reduces conduction of heat thereto further, improving heating of the fixing belt 310.

A description is provided of a configuration of a first comparative fixing device.

The first comparative fixing device includes a heater constructed of a base and a resistive heat generator. The resistive heat generator is produced by printing a heat generating pattern made of a resistive heat generating material on a surface of the base by screen printing.

As the line width and the thickness of the heat generating pattern decrease, variation in total resistance value may increase, rendering it difficult to control power supplied to the resistive heat generator appropriately. If the first comparative fixing device employing the resistive heat generator does not control power appropriately, the temperature of a thin, fixing belt may change substantially, resulting in failure in fixing a toner image on a recording medium or peeling off of toner of the toner image from the recording medium.

To address this circumstance, a second comparative fixing device includes a controller that corrects a power duty cycle based on a temperature-time property of the resistive heat generator to obtain an appropriate power (e.g., a heater output). However, the controller does not consider variation in power (e.g., the heater output) caused by variation in resistance value of the resistive heat generator.

A detailed description is now given of a construction of the heater 91.

As illustrated in FIGS. 2A, 2B, 2C, and 2D, the heater 91 includes the heat generator 360 that includes a resistive heat generator.

Figure 3A:
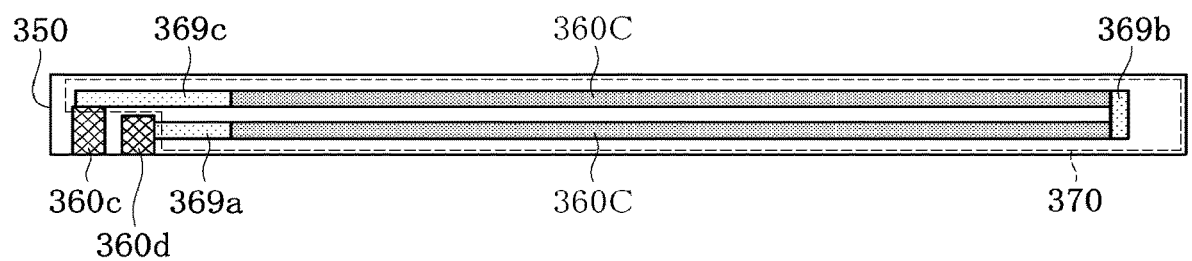
FIG. 3A is a plan view of heat generators installable in the fixing device depicted in FIG. 2A, which are coupled to electrodes at one lateral end of the heat generators.
Figure 3B:
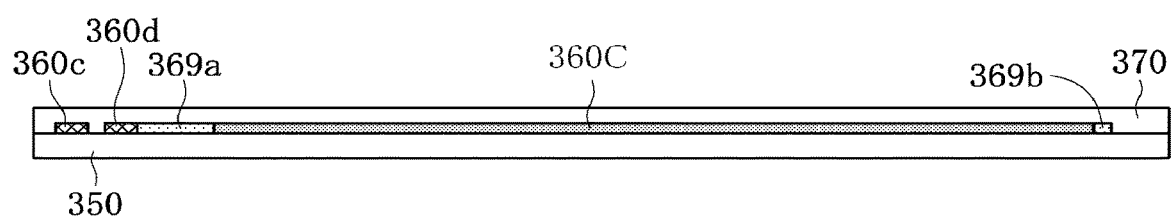
FIG. 3B is a cross-sectional view of the heat generator depicted in FIG. 3A.

FIG. 3A is a plan view of heat generators 360C that are installable in the fixing device 300 depicted in FIG. 2A and are coupled to electrodes 360c and 360d at one lateral end of the heat generators 360C. FIG. 3B is a cross-sectional view of the heat generator 360C. As illustrated in FIGS. 3A and 3B, the heater 91 includes the base 350 mounting the heat generators 360C. The base 350 includes an elongate, thin metal plate and an insulator that coats the metal plate.

The base 350 is preferably made of aluminum, stainless steel, or the like that is available at reduced costs. Alternatively, instead of metal, the base 350 may be made of ceramic such as alumina and aluminum nitride or a nonmetallic material that has an increased heat resistance and an increased insulation such as glass and mica.

In order to improve evenness of heat generated by the heater 91 so as to enhance quality of an image formed on a sheet P, the base 350 may be made of a material that has an increased thermal conductivity such as copper, graphite, and graphene. According to this embodiment, the base 350 is made of alumina and has a short width of 8 mm, a longitudinal width of 270 mm, and a thickness of 1.0 mm.

As illustrated in FIG. 3A, specifically, the heat generators 360C mounted on the base 350 are extended linearly in a longitudinal direction of the base 350 and are arranged in series and in two lines in parallel to each other. One end of one of the heat generators 360C is connected to the electrode 360c through a feeder 369c. One end of another one of the heat generators 360C is connected to the electrode 360d through a feeder 369a. The feeders 369a and 369c, having a decreased resistance value, are disposed on one end of the base 350 and extended in the longitudinal direction of the base 350. The electrodes 360c and 360d supply power to the heat generators 360C, respectively. The electrodes 360c and 360d are coupled to a power supply device including an alternating current power supply 410 described below with reference to FIG. 4.

Another end of one of the heat generators 360C is connected to another end of another one of the heat generators 360C through a feeder 369b such that one of the heat generators 360C, that extends in the longitudinal direction of the base 350 and in a direction directed to the feeder 369b, is turned at the feeder 369b and another one of the heat generators 360C extends in the longitudinal direction of the base 350 and in an opposite direction. The feeder 369b, having a decreased resistance value, is disposed on another end of the base 350 in the longitudinal direction thereof and extended in the short direction of the base 350. Each of the heat generators 360C, the electrodes 360c and 360d, and the feeders 369a, 369b, and 369c is produced by screen printing to have a predetermined line width and a predetermined thickness.

For example, the heat generators 360C are produced as below. Silver (Ag) or silver-palladium (AgPd) and glass powder and the like are mixed into paste. The paste coats the base 350 by screen printing or the like. Thereafter, the base 350 is subject to firing. For example, each of the heat generators 360C has a resistance value of 10Ω at an ambient temperature. Alternatively, the heat generators 360C may be made of a resistive material such as a silver alloy (AgPt) and ruthenium oxide ($RuO_2$).

A thin overcoat layer or an insulating layer 370 covers a surface of each of the heat generators 360C and the feeders 369a, 369b, and 369c. The insulating layer 370 attains insulation between the fixing belt 310 and the heat generators 360C and between the fixing belt 310 and the feeders 369a, 369b, and 369c while facilitating sliding of the fixing belt 310 over the insulating layer 370.

For example, the insulating layer 370 is made of heat resistant glass and has a thickness of 75 micrometers. The heat generators 360C heat the fixing belt 310 that contacts the insulating layer 370 by conduction of heat, increasing the temperature of the fixing belt 310 so that the fixing belt 310 heats and fixes the unfixed toner image on the sheet P conveyed through the fixing nip SN.

A description is provided of a configuration of the heat generator 360 including a plurality of positive temperature coefficient (PTC) elements.

As illustrated in FIGS. 3C, 3D, 3E, 3F, 3G, and 3H, the heat generator 360 may include PTC elements 361 to 368 that are electrically connected in parallel. The PTC elements 361 to 368 serve as resistive heat generators or resistive elements. In this case, if a total resistance value of the heat generator 360 is 10Ω, a resistance value of each of the PTC elements 361 to 368 is 80Ω that is greater than the total resistance value of the heat generator 360.

The PTC elements 361 to 368 are made of a material that has a temperature coefficient of resistance (TCR) that is positive. The material having the TCR is characterized in that the resistance value increases as a temperature T increases, that is, a heater output decreases as an electric current value 1 decreases. For example, the TCR is 1,500 parts per million (PPM). A memory of a power controller 400 described below with reference to FIG. 4 stores the TCR.

Figure 3C:
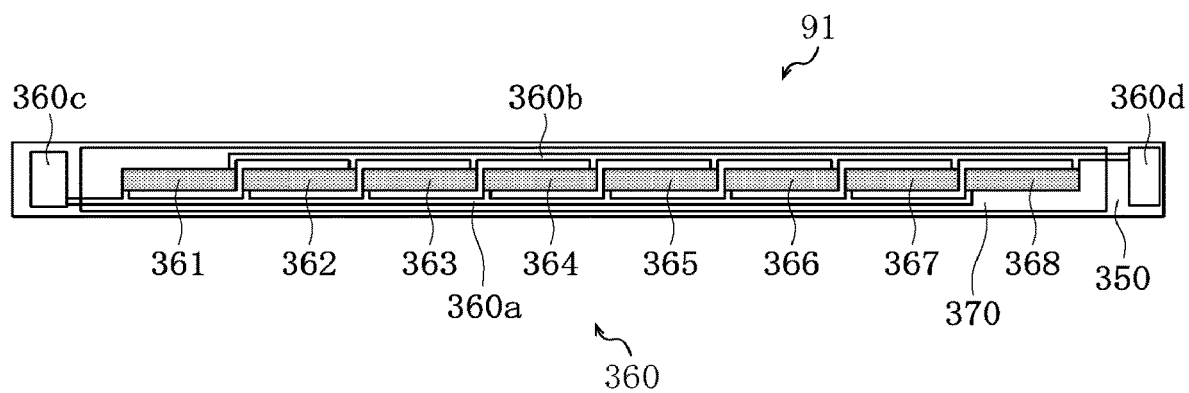
FIG. 3C is a plan view of positive temperature coefficient (PTC) elements incorporated in the heater of the fixing device depicted in FIG. 2A, which are connected in parallel, illustrating the electrodes coupled to both lateral ends of the PTC elements, respectively.

As illustrated in FIGS. 3C, 3D, 3E, 3F, 3G, and 3H, the PTC elements 361 to 368 extend linearly in the longitudinal direction of the base 350 with an identical interval between adjacent ones of the PTC elements 361 to 368. Feeders 360a and 360b having a decreased resistance value are disposed linearly at both ends of each of the PTC elements 361 to 368, respectively, in a short direction thereof such that the feeder 360a is parallel to the feeder 360b. Both ends of each of the PTC elements 361 to 368 are coupled to the feeders 360a and 360b, respectively. FIG. 3C is a plan view of the PTC elements 361 to 368 connected in parallel and the electrodes 360c and 360d coupled to both ends of the PTC elements 361 to 368, respectively. FIG. 4 is a diagram illustrating a power supply circuit 540 and the power controller 400. As illustrated in FIG. 4, the power supply device including the alternating current power supply 410 is coupled to the electrodes 360c and 360d coupled to the feeders 360a and 360b, respectively, at one end of each of the feeders 360a and 360b.

Like the heat generators 360C connected in series as described above with reference to FIG. 3A, the PTC elements 361 to 368 and the feeders 360a and 360b are also covered by the thin, insulating layer 370. For example, the insulating layer 370 is made of heat resistant glass and has a thickness of 75 micrometers. The insulating layer 370 insulates and protects the PTC elements 361 to 368 and the feeders 360a and 360b while retaining smooth sliding of the fixing belt 310.

For example, the PTC elements 361 to 368 are produced as below. Silver-palladium (AgPd), glass powder, and the like are mixed into paste. The paste coats the base 350 by screen printing or the like. Thereafter, the base 350 is subject to firing. According to this embodiment, each of the PTC elements 361 to 368 has a resistance value of 80Ω at an ambient temperature with a total resistance value of 10Ω.

Alternatively, the PTC elements 361 to 368 may be made of a resistive material such as a silver alloy (AgPt) and ruthenium oxide ($RuO_2$). The feeders 360a and 360b and the electrodes 360c and 360d are made of a material prepared with silver (Ag) or silver-palladium (AgPd) by screen printing or the like.

An insulating layer side face of each of the PTC elements 361 to 368, which is disposed opposite the insulating layer 370, contacts and heats the fixing belt 310 depicted in FIG. 2A, increasing the temperature of the fixing belt 310 by conduction of heat so that the fixing belt 310 heats and fixes the unfixed toner image on the sheet P conveyed through the fixing nip SN.

Figure 5A:
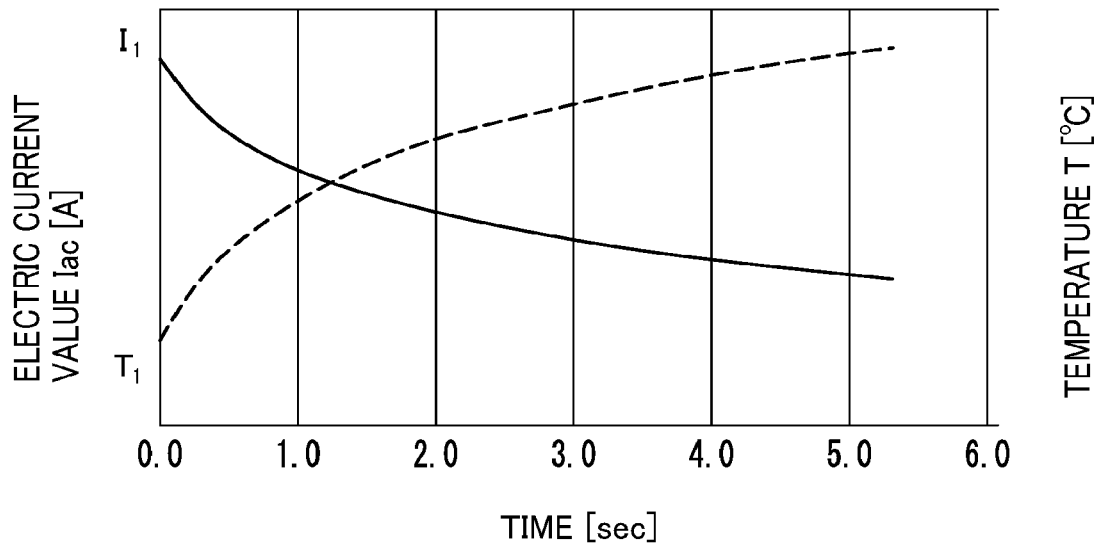
FIG. 5A is a graph illustrating change in a temperature and an electric current of a resistive heat generator.

FIG. 5A is a graph illustrating change in the temperature of a resistive heat generator (e.g., the PTC elements 361 to 368) and the electric current. With the PTC elements 361 to 368, if the temperature of outboard ones of the PTC elements 361 to 368, that are disposed in a non-conveyance span where small sheets P are not conveyed, increases, the amount of heat generated by the outboard ones of the PTC elements 361 to 368 decreases due to a property of the temperature of the heat generator that varies depending on the resistance as illustrated in FIG. 5A, thus suppressing temperature increase of the PTC elements 361 to 368. Accordingly, if printing is performed with a sheet P having a narrow width that is smaller than a combined width of the PTC elements 361 to 368, for example, if the width of the sheet P is equivalent to a combined width of the PTC elements 363 to 366 or smaller, since the sheet P does not draw heat from the PTC elements 361, 362, 367, and 368 that are disposed outboard from the sheet P in a width direction thereof parallel to the longitudinal direction of the heat generator 360, the PTC elements 361, 362, 367, and 368 are subject to temperature increase. Consequently, the resistance value of the PTC elements 361, 362, 367, and 368 increases.

Since a constant voltage is applied to the PTC elements 361 to 368, an output from the PTC elements 361, 362, 367, and 368 disposed outboard from the sheet P in the width direction thereof decreases relatively, suppressing temperature increase of the PTC elements 361, 362, 367, and 368 that are disposed at both lateral ends of the heat generator 360 in the longitudinal direction thereof if the PTC elements 361 to 368 are electrically connected in series, a sole method to suppress temperature increase of the PTC elements 361, 362, 367, and 368 that are disposed outboard from the sheet P in the width direction thereof during continuous printing is to decrease the printing speed. To address this circumstance, the PTC elements 361 to 368 are electrically connected in parallel, suppressing temperature increase in the non-conveyance span where the sheet P is not conveyed while retaining the printing speed.

The arrangement of the PTC elements 361 to 368 is not limited to an arrangement illustrated in FIG. 3C. With the arrangement of the PTC elements 361 to 368 illustrated in FIG. 3C, an interval that is continuous in the short direction of the PTC elements 361 to 368 is provided between adjacent ones of the PTC elements 361 to 368. Accordingly, the heat generator 360 generates a decreased amount of heat in the interval, causing the fixing device 300 to be susceptible to variation in fixing the toner image on the sheet P. To address this circumstance, as illustrated in FIGS. 3D and 3E, the PTC elements 361 to 368 are arranged to overlap each other at both lateral ends of each of the PTC elements 361 to 368 in a longitudinal direction thereof.

Figure 3D:
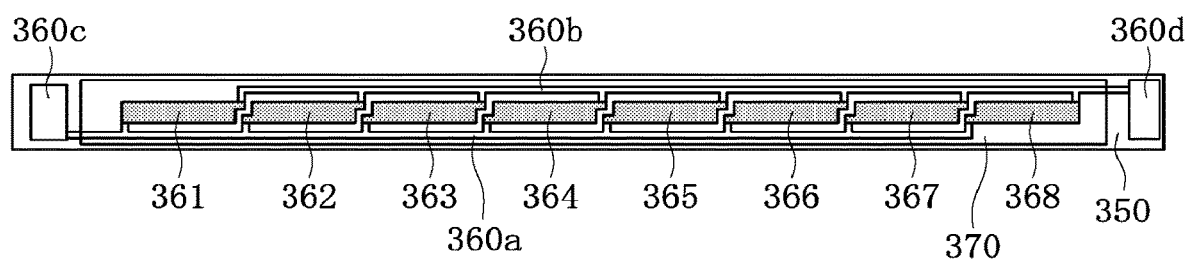
FIG. 3D is a plan view of the PTC elements depicted in FIG. 3C, illustrating a first variation in shape.
Figure 4:
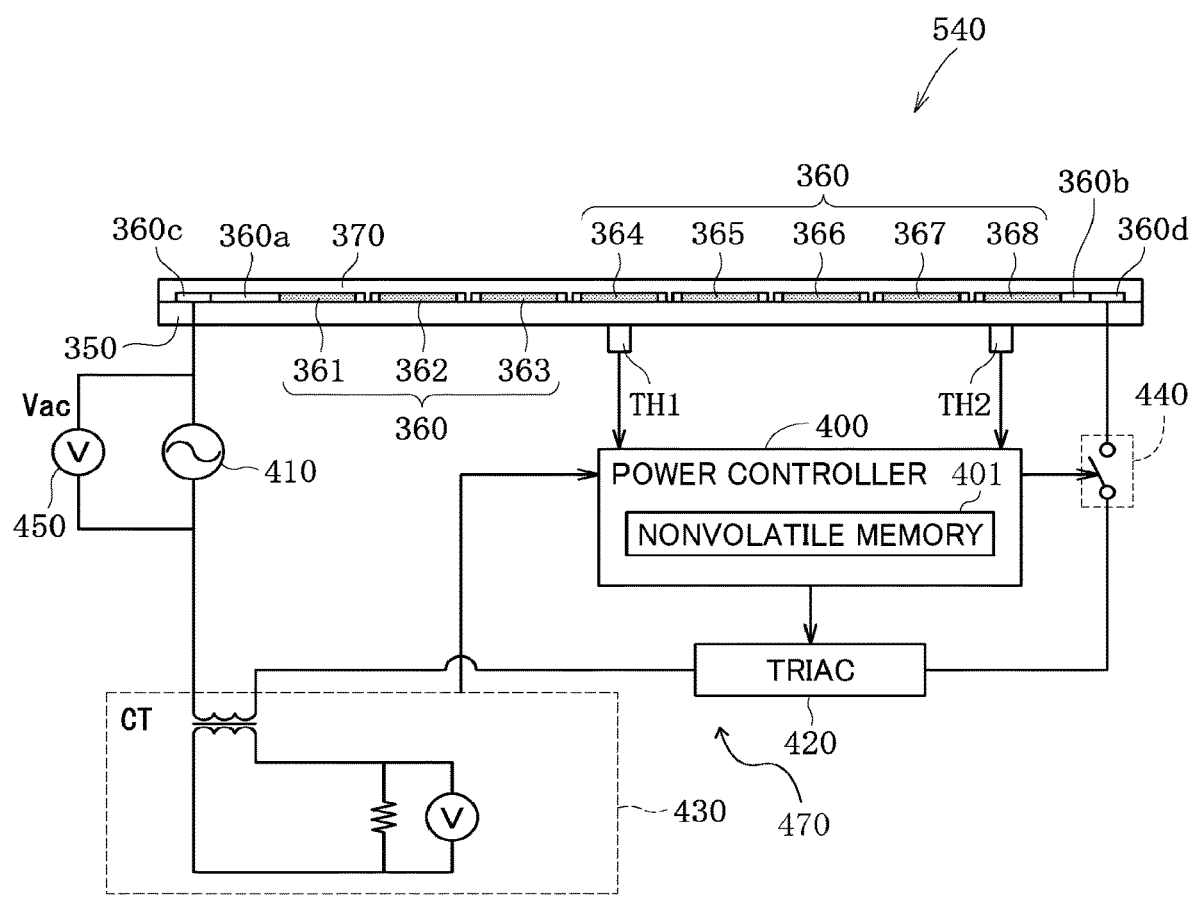
FIG. 4 is a diagram illustrating the heater, a power supply circuit, and a power controller of the fixing device depicted in FIG. 2A.

FIG. 3D is a plan view of the PTC elements 361 to 368, illustrating a first variation in shape. As illustrated in FIG. 3D, each of the PTC elements 361 to 368 includes a step (e.g., an L-shaped cut portion) disposed at one lateral end or both lateral ends of each of the PTC elements 361 to 368 in the longitudinal direction thereof. The step of one of the PTC elements 361 to 368 overlaps the step of an adjacent one of the PTC elements 361 to 368.

Figure 3E:
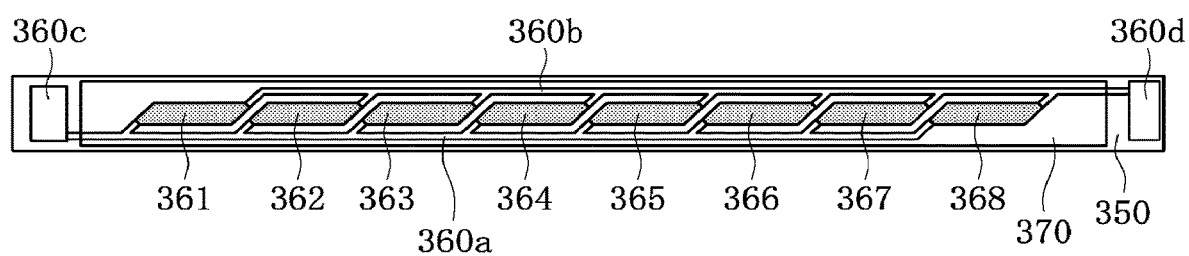
FIG. 3E is a plan view of the PTC elements depicted in FIG. 3C, illustrating a second variation in shape.

FIG. 3E is a plan view of the PTC elements 361 to 368, illustrating a second variation in shape. As illustrated in FIG. 3E, each of the PTC elements 361 to 368 includes a slope (e.g., an inclined cut portion) disposed at both lateral ends of each of the PTC elements 361 to 368 in the longitudinal direction thereof. The slope of one of the PTC elements 361 to 368 overlaps the slope of an adjacent one of the PTC elements 361 to 368. Thus, as illustrated in FIGS. 3D and 3E, the PTC elements 361 to 368 overlap each other at both lateral ends of each of the PTC elements 361 to 368 in the longitudinal direction thereof, suppressing decrease in the amount of heat generation at the interval between the adjacent ones of the PTC elements 361 to 368 and thereby suppressing resultant adverse affecting.

Figure 3F:
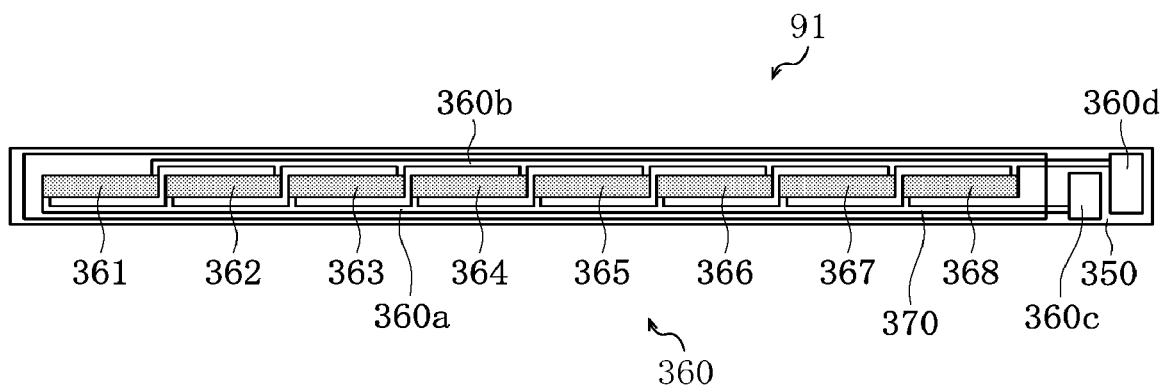
FIG. 3F is a plan view of the PTC elements installable in the heater of the fixing device depicted in FIG. 2A, which are connected in parallel, illustrating the electrodes coupled to one lateral end of the PTC elements.
Figure 3G:
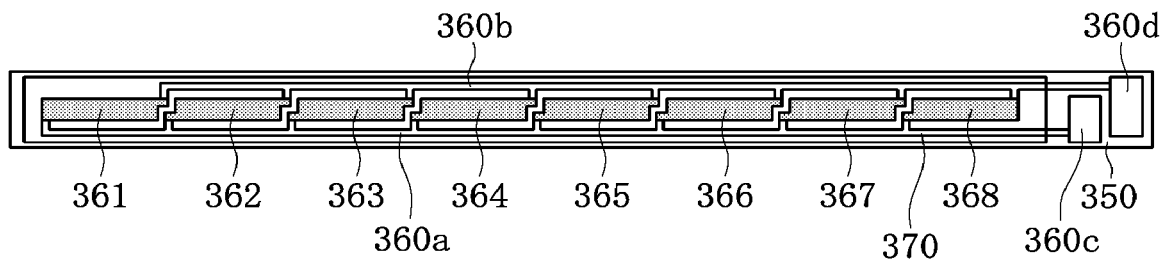
FIG. 3G is a plan view of the PTC elements depicted in FIG. 3F, illustrating the first variation in shape.
Figure 3H:
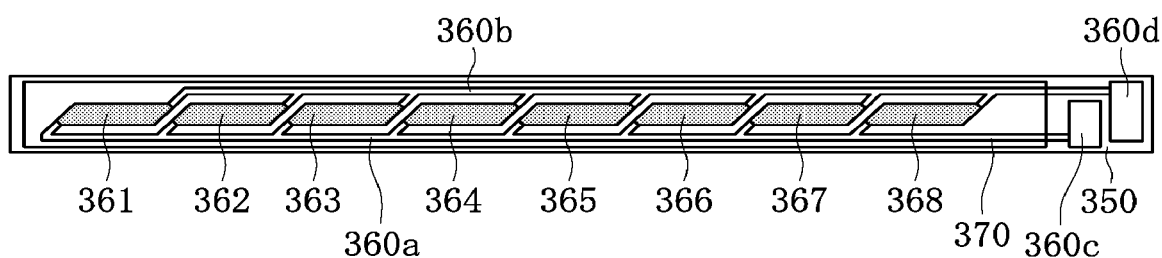
FIG. 3H is a plan view of the PTC elements depicted in FIG. 3F, illustrating the second variation in shape.
Figure 3I:
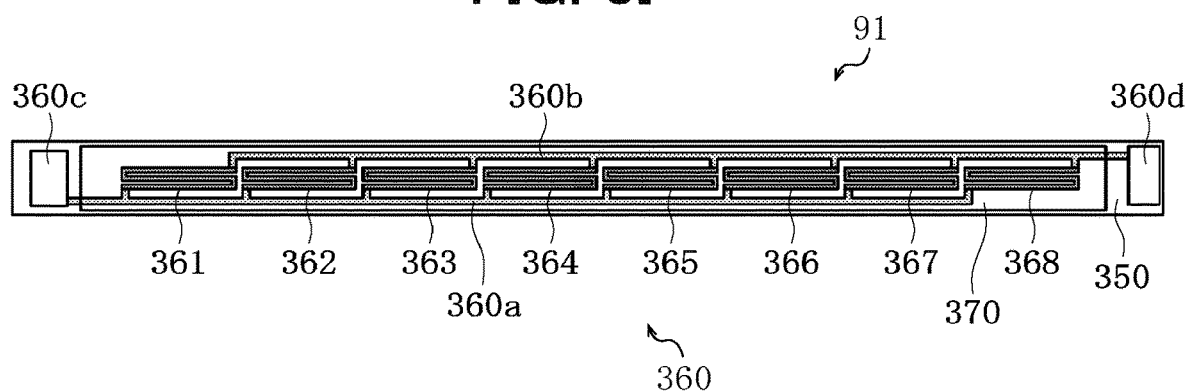
FIG. 3I is a plan view of the PTC elements installable in the heater of the fixing device depicted in FIG. 2A, illustrating a first arrangement of a serpentine pattern of the PTC elements sandwiched between the electrodes coupled to both lateral ends of the PTC elements, respectively.
Figure 3J:
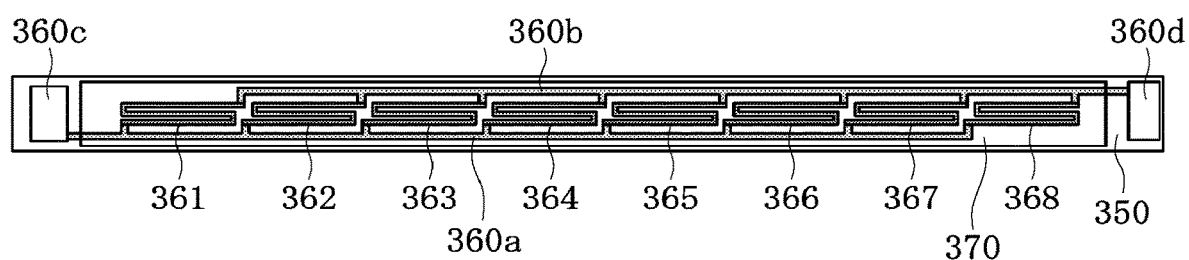
FIG. 3J is a plan view of the PTC elements installable in the heater of the fixing device depicted in FIG. 2A, illustrating a second arrangement of the serpentine pattern of the PTC elements depicted in FIG. 3I.
Figure 3K:
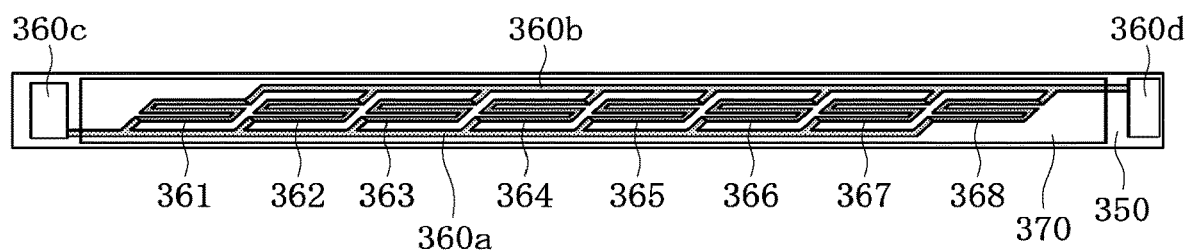
FIG. 3K is a plan view of the PTC elements installable in the heater of the fixing device depicted in FIG. 2A, illustrating a third arrangement of the serpentine pattern of the PTC elements depicted in FIG. 3I.
Figure 3L:
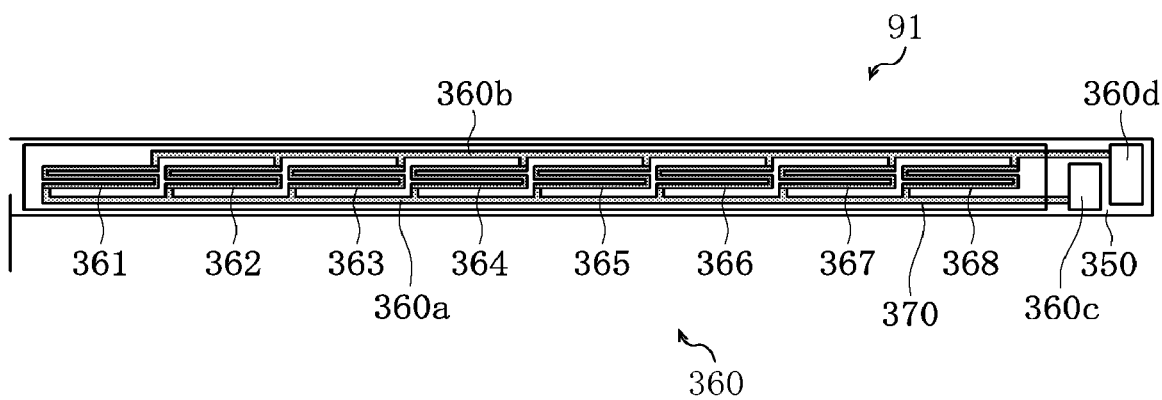
FIG. 3L is a plan view of the PTC elements installable in the heater of the fixing device depicted in FIG. 2A, illustrating a fourth arrangement of the serpentine pattern of the PTC elements with the electrodes coupled to one lateral end of the PTC elements.
Figure 3M:
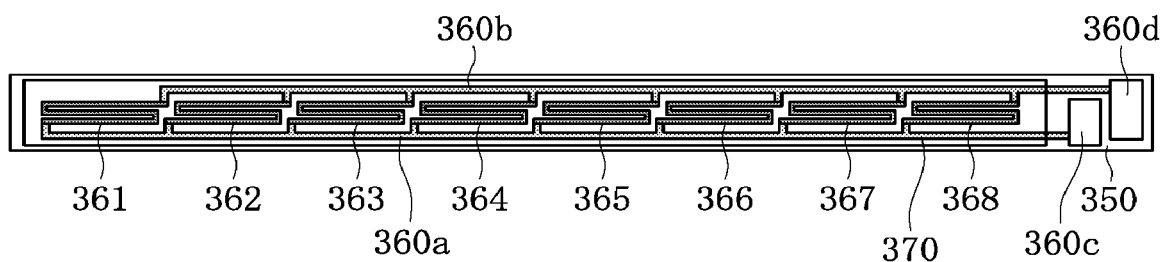
FIG. 3M is a plan view of the PTC elements installable in the heater of the fixing device depicted in FIG. 2A, illustrating a fifth arrangement of the serpentine pattern of the PTC elements depicted in FIG. 3L.
Figure 3N:
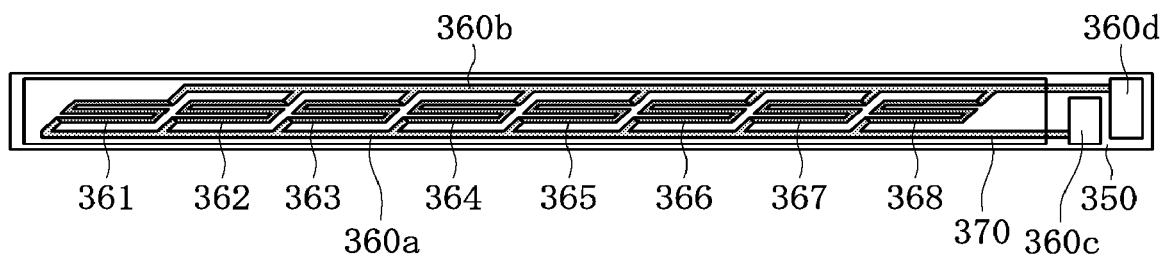
FIG. 3N is a plan view of the PTC elements installable in the heater of the fixing device depicted in FIG. 2A, illustrating a sixth arrangement of the serpentine pattern of the PTC elements depicted in FIG. 3L.

As illustrated in FIGS. 3C, 3D, and 3E, the electrodes 360c and 360d sandwich the PTC elements 361 to 368 in the longitudinal direction thereof. Alternatively, as illustrated in FIGS. 3F, 3G, and 3H, the electrodes 360c and 360d may be disposed at one lateral end of the heat generator 360 in the longitudinal direction thereof. The electrodes 360c and 360d disposed at one lateral end of the heat generator 360 in the longitudinal direction thereof save space in the longitudinal direction. FIG. 3F is a plan view of the PTC elements 361 to 368 connected in parallel, illustrating the electrodes 360c and 360d disposed at one lateral end of the heat generator 360 in the longitudinal direction thereof. FIG. 3G is a plan view of the PTC elements 361 to 368, illustrating the first variation in shape. FIG. 3H is a plan view of the PTC elements 361 to 368, illustrating the second variation in shape.

As illustrated in FIGS. 3C, 3D, 3E, 3F, 3G, and 3H, each of the PTC elements 361 to 368 is a rectangular laminated heat generator. Alternatively, as illustrated in FIGS. 3I, 3J, 3K, 3L, 3M, and 3N, each of the PTC elements 361 to 368 may have a decreased line width and may be turned to be serpentine so as to attain a desired output (e.g., a resistance value). The plurality of PTC elements (e.g., the eight PTC elements 361 to 368) is electrically connected in parallel. As illustrated in FIGS. 3I, 3J, 3K, 3L, 3M, and 3N, in each of the PTC elements 361 to 368, a narrow wire is turned twice to produce a bending pattern with one reciprocation and a half.

In order to achieve a greater resistance value, the PTC elements 361 to 368 are as narrow and thin as possible, that is, the line width and the thickness of the PTC elements 361 to 368 are as small as possible, to increase the number of serpentine nodes. However, variation in the line width and the thickness increases among the PTC elements 361 to 368, varying the resistance value of the heat generator 360 substantially. The embodiments of the present disclosure reduce substantial variation in the resistance value of the heat generator 360.

The material and the thermal conductivity of each of the base 350 and the PTC elements 361 to 368 are adjusted so that the PTC elements 361 to 368 heat the fixing belt 310 at the fixing nip SN through the base 350 also. Hence, the base 350 is preferably made of a material having an increased thermal conductivity such as aluminum nitride.

A gap is provided between adjacent ones of the PTC elements 361 to 368 for insulation. If the gap is excessively great, an amount of heat generation may decrease at the gap, causing variation in fixing. Conversely, if the gap is excessively small, a short circuit may occur between the PTC elements 361 to 368.

To address this circumstance, the size of the gap is preferably in a range of from 0.3 mm to 1.0 mm and more preferably in a range of from 0.4 mm to 0.7 mm. As described above, the PTC elements 361 to 368 heat the fixing belt 310 at the fixing nip SN through the base 350, suppressing variation in fixing caused by the gap between the adjacent ones of the PTC elements 361 to 368.

A description is provided of a configuration of temperature sensors incorporated in the heater 91.

As illustrated in FIG. 4, the heater 91 according to this embodiment includes a first temperature sensor TH1 and a second temperature sensor TH2 that serve as temperature detectors that detect the temperature of the resistive heat generators (e.g., the PTC elements 361 to 368). For example, each of the first temperature sensor TH1 and the second temperature sensor TH2 is a thermistor.

As illustrated in FIG. 4, a spring pressingly attaches each of the first temperature sensor TH1 and the second temperature sensor TH2 to a back face of the base 350. The first temperature sensor TH1 is used for temperature control. The second temperature sensor TH2 is used to ensure safety. Each of the two temperature sensors, that is, the first temperature sensor TH1 and the second temperature sensor TH2, is a contact type thermistor having a thermal time constant that is smaller than one second.

The first temperature sensor TH1 for temperature control is disposed in a heating span of the PTC element 364, that is, a fourth PTC element from the left in FIG. 4. The PTC element 364 serves as a primary resistive heat generator disposed in a center span in the longitudinal direction of the base 350, which defines a minimum sheet conveyance span where a minimum size sheet P is conveyed. The second temperature sensor TH2 to ensure safety is disposed in a heating span of the PTC element 368, that is, an eighth PTC element from the left in FIG. 4. The PTC element 368 serves as a secondary resistive heat generator disposed in an endmost span in the longitudinal direction of the base 350. Alternatively, the second temperature sensor TH2 may be disposed in a heating span of the PTC element 361, that is, a first PTC element from the left in FIG. 4.

The two temperature sensors, that is, the first temperature sensor TH1 and the second temperature sensor TH2, are disposed in the heating spans defined by the PTC elements 364 and 368, respectively. Each of the first temperature sensor TH1 and the second temperature sensor TH2 is not disposed in an interval span between the adjacent ones of the PTC elements 361 to 368, which suffers from a decreased heat generation amount. Accordingly, the first temperature sensor TH1 and the second temperature sensor TH2 improve temperature control and facilitate detection of disconnection when a part of the PTC elements 361 and 368 suffers from disconnection.

Alternatively, the first temperature sensor TH1 may be disposed in a heating span of any one of the PTC elements 363, 365, and 366. For example, the second temperature sensor TH2 may be disposed in a heating span of the PTC element 362, that is, a second PTC element from the left in FIG. 4, or the PTC element 367, that is, a seventh PTC element from the left in FIG. 4, as long as the second temperature sensor TH2 is disposed in a lateral end span of the heat generator 360 in the longitudinal direction thereof. That is, the second temperature sensor TH2 may not be disposed in the endmost span of the heat generator 360 in the longitudinal direction thereof.

A description is provided of a construction of the power supply circuit 540 for supplying power to the heater 91.

FIG. 4 illustrates the power supply circuit 540 that supplies power to the heater 91. The heater 91 employs the heat generator 360 that includes the PTC elements 361 to 368 depicted in FIGS. 3C, 3D, 3E, 3F, 3G, and 3H. FIG. 4 illustrates the power supply circuit 540 situated below the heater 91. The power supply circuit 540 supplies power to the heat generator 360 or the PTC elements 361 to 368.

The power supply circuit 540, serving as a power control device, includes the power controller 400, the alternating current power supply 410, a triac 420, an electric current detector 430, a heater relay 440, and a voltage detector 450. The alternating current power supply 410, a current transformer CT of the electric current detector 430, the triac 420, and the heater relay 440 are connected in series and disposed between the electrodes 360c and 360d. The voltage detector 450 and the alternating current power supply 410 are connected in parallel. The power controller 400 and the triac 420 are incorporated in a power supply device 470.

The power supply circuit 540 depicted in FIG. 4 is usually disposed inside the body of the image forming apparatus 100.

Temperatures $T_4$ and $T_8$ detected by the first temperature sensor TH1 and the second temperature sensor TH2, respectively, are input to the power controller 400. Based on the temperature $T_4$ sent from the first temperature sensor TH1, the power controller 400 performs duty control with the triac 420 on an electric current supplied to the electrodes 360c and 360d so that each of the PTC elements 361 to 368 attains a predetermined target temperature.

For example, with a duty cycle based on a difference between the current temperature $T_4$ sent from the first temperature sensor TH1 and the target temperature, the power controller 400 causes the triac 420 to perform duty control on the electric current that flows through the heat generator 360. The electric current is zero at a duty cycle of 0%. The electric current is maximum at a duty cycle of 100%.

Figure 5B:
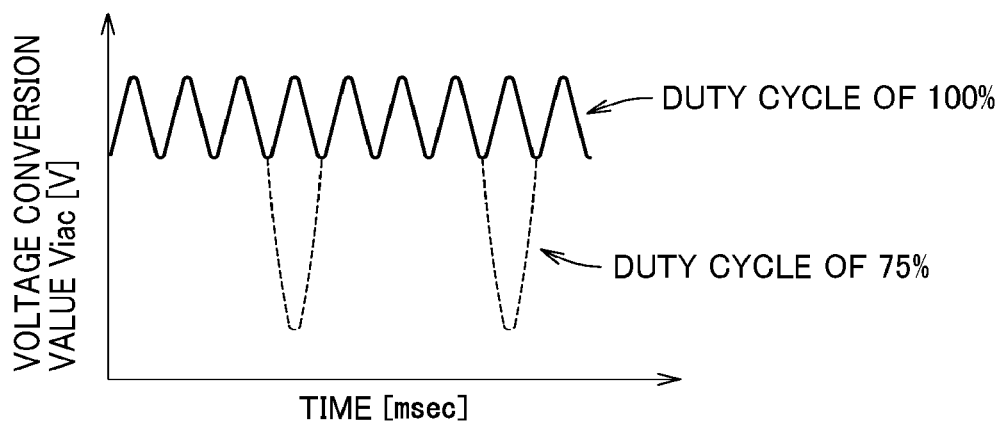
FIG. 5B is a graph illustrating change in a voltage waveform under duty control.
Figure 5C:
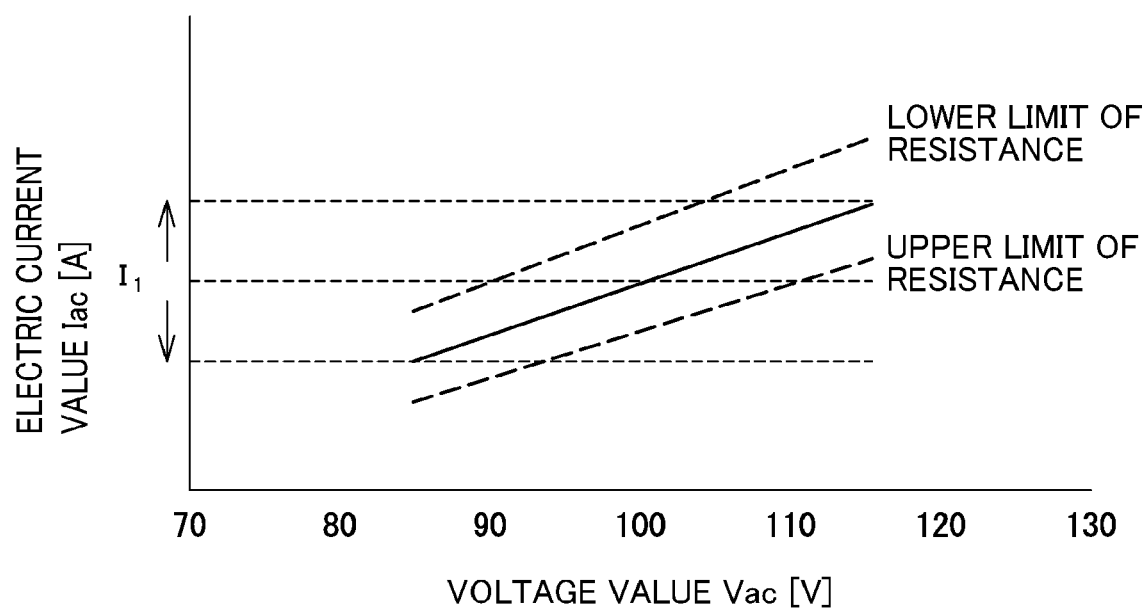
FIG. 5C is a graph illustrating a correlation between a voltage and the electric current of the resistive heat generator.

FIG. 5B is a graph illustrating change in voltage waveform under duty control. FIG. 5C is a graph illustrating a correlation between the voltage and the electric current of the resistive heat generators (e.g., the PTC elements 361 to 368). FIG. 5B illustrates a voltage conversion value Viac of the electric current supplied at a duty cycle of 100% and a duty cycle of 75% as an example. Under duty control at the duty cycle of 75%, the voltage conversion value Viac fluctuates substantially in a predetermined cycle. The duty cycle defines a rate of a time period for which power is supplied to the heat generator 360 per control cycle.

The power controller 400 includes a microcomputer that includes a central processing unit (CPU), a read-only memory (ROM), a random access memory (RAM), and an input-output (I/O) interface. When a sheet P is conveyed through the fixing nip SN formed between the fixing belt 310 and the pressure roller 320 depicted in FIG. 2A, the sheet P draws heat from the fixing belt 310, generating an amount of heat conducted to the sheet P. To address this circumstance, the power controller 400 depicted in FIG. 4 controls the electric current supplied to the PTC elements 361 to 368 by considering the amount of heat conducted to the sheet P in addition to the temperature $T_4$ sent from the first temperature sensor TH1, thus adjusting the temperature of the fixing belt 310 to a desired temperature.

The electric current detector 430 detects a total sum of the electric current that flows through the heat generator 360. For example, the power controller 400 reads an amount of the electric current that flows between the electrodes 360c and 360d via a voltage that generates in a secondary resistor of the current transformer CT. The voltage detector 450 detects a voltage value E between the electrodes 360c and 360d of the heat generator 360. The power controller 400 reads the voltage value E. The power controller 400 calculates a resistance value R of the heat generator 360 based on the electric current value 1 and the voltage value E (R=E/I). It is to be noted that, in this disclosure, the term "calculate" is used to encompass "recognize".

If one of the PTC elements 361 to 368 suffers from failure or disconnection, the electric current value read by the power controller 400 decreases. For example, if the PTC element 364 of which temperature is detected by the first temperature sensor TH1 suffers from failure or disconnection, the power controller 400 does not perform temperature control. Accordingly, regardless of the temperature of other PTC elements, that is, the PTC elements 361 to 363 and 365 to 368, the triac 420 may continue supplying power to the electrodes 360c and 360d at the duty cycle of 100%.

To address this circumstance, in the heater 91 according to this embodiment, when the electric current detected by the electric current detector 430 is smaller than a predetermined threshold electric current, the power controller 400 turns off the heater relay 440 to interrupt the electric current that flows through the electrodes 360c and 360d. For example, the electric current detector 430 detects the amount of the electric current that flows through the PTC elements 361 to 368 with the voltage conversion value Viac obtained by the current transformer CT by voltage conversion.

The power controller 400 compares the voltage conversion value Viac with a predetermined threshold voltage Vith stored in the power controller 400 in advance. As a result, when the voltage conversion value Viac is smaller than the threshold voltage Vith, that is, when the amount of the electric current supplied to the PTC elements 361 to 368 is smaller than the predetermined threshold electric current, the power controller 400 turns off the heater relay 440, interrupting supplying power to the PTC elements 361 to 368.

Similarly, the power controller 400 may cause the triac 420 to obtain the duty cycle of 0% to interrupt supplying power. However, the power controller 400 turns off the heater relay 440 to interrupt the electric current precisely. Alternatively, when the temperature $T_8$ detected by the second temperature sensor TH2 is higher than a predetermined threshold, the power controller 400 may turn off the heater relay 440 to interrupt the electric current that flows through the electrodes 360c and 360d practically.

A description is provided of an operation of the fixing device 300 to fix a toner image on a sheet P.

As illustrated in FIG. 2A, as the sheet P conveyed in a direction indicated by an arrow passes through the fixing nip SN, the fixing belt 310 and the pressure roller 320 sandwich the sheet P and fix the toner image on the sheet P under heat. While the fixing belt 310 slides over the insulating layer 370 covering the heat generator 360, the heat generator 360 heats the fixing belt 310.

Under a temperature control to cause the heat generator 360 to heat the fixing belt 310 to a predetermined temperature, if the first temperature sensor TH1 is installed solely, when the PTC element 364 disposed opposite the first temperature sensor TH1 as illustrated in FIG. 4 solely suffers from partial disconnection and interruption of power supply, the temperature of the PTC element 364 does not increase. To address this circumstance, in order to retain the PTC element 364 at a constant temperature, the temperature control continues supplying the electric current to other normal PTC elements, that is, the PTC elements 361 to 363 and 365 to 368, excessively, causing an abnormally increased temperature.

To address this circumstance, according to this embodiment, the second temperature sensor TH2 is disposed in the heating span of the PTC element 368 situated at one lateral end of the heat generator 360 in the longitudinal direction thereof. The second temperature sensor TH2 detects the temperature $T_8$ of the PTC element 368. If the temperature $T_8$ is the abnormally increased temperature or higher, the power controller 400 controls the triac 420 to interrupt supplying the electric current to the electrodes 360c and 360d. Also, if the second temperature sensor TH2 suffers from disconnection and thereby the PTC element 368 has a predetermined temperature $T_N$ or lower, for example, if the temperature $T_8$ is lower than the predetermined temperature $T_N$, the power controller 400 controls the triac 420 to interrupt supplying the electric current to the electrodes 360c and 360d.

A description is provided of variations of the fixing device 300.

The fixing device 300 according to the first embodiment depicted in FIG. 2A provides variations thereof.

Referring to FIGS. 2B, 2C, and 2D, the following describes a construction of the fixing devices 300S, 300T, and 300U according to the second embodiment, the third embodiment, and the fourth embodiment, respectively.

As illustrated in FIG. 2B, the fixing device 300S according to the second embodiment includes a pressing roller 390 disposed opposite the pressure roller 320 via the fixing belt 310. The pressing roller 390 and the heater 91 sandwich the fixing belt 310 such that the heater 91 heats the fixing belt 310.

The heater 91 is disposed inside the loop formed by the fixing belt 310. A supplementary stay 331 is mounted on a first side of the stay 330. A nip forming pad 332 serving as a nip former is mounted on a second side of the stay 330, which is opposite the first side thereof. The heater 91 is supported by the supplementary stay 331. The pressure roller 320 is pressed against the nip forming pad 332 via the fixing belt 310 to form the fixing nip SN between the fixing belt 310 and the pressure roller 320.

As illustrated in FIG. 2C, the fixing device 300T according to the third embodiment includes the heater 91 disposed inside the loop formed by the fixing belt 310. Since the fixing device 300T eliminates the pressing roller 390 depicted in FIG. 2B, in order to increase the length for which the heater 91 contacts the fixing belt 310 in a circumferential direction thereof, the base 350 and the insulating layer 370 of the heater 91 are curved into an arc in cross-section that corresponds to a curvature of the fixing belt 310. The heat generator 360 is disposed at a center of the base 350, that is arc-shaped, in the circumferential direction of the fixing belt 310. Except for elimination of the pressing roller 390 and the shape of the heater 91, the fixing device 300T according to the third embodiment is equivalent to the fixing device 300S according to the second embodiment depicted in FIG. 2B.

As illustrated in FIG. 2D, the fixing device 300U according to the fourth embodiment defines a heating nip HN separately from the fixing nip SN. For example, the nip forming pad 332 and a stay 333 that includes a channel made of metal are disposed opposite the fixing belt 310 via the pressure roller 320. A pressure belt 334 that is rotatable accommodates the nip forming pad 332 and the stay 333. As a sheet P bearing a toner image is conveyed through the fixing nip SN formed between the pressure belt 334 and the pressure roller 320, the pressure belt 334 and the pressure roller 320 heat and fix the toner image on the sheet P. Except for the pressure belt 334 accommodating the nip forming pad 332 and the stay 333, the fixing device 300U according to the fourth embodiment is equivalent to the fixing device 300 according to the first embodiment depicted in FIG. 2A.

Alternatively, as illustrated in FIG. 2A with a dotted line, a biasing member may press the second temperature sensor TH2, that is used to ensure safety, against the inner circumferential surface of the fixing belt 310. The second temperature sensor TH2 is disposed downstream from the PTC element 368 in a rotation direction of the fixing belt 310. As illustrated in FIG. 4, the second temperature sensor TH2 is disposed opposite the inner circumferential surface of the fixing belt 310 in the heating span of the PTC element 368 that is different from the heating span of the PTC element 364 of which temperature is detected by the first temperature sensor TH1 used for temperature control. As the number of PTC elements (e.g., resistive heat generators) increases, it is difficult to spare a space for temperature sensors. To address this circumstance, the second temperature sensor TH2 is disposed as described above with reference to FIG. 2A, rendering it to be less difficult to spare the space for the temperature sensors. Alternatively, the second temperature sensor TH2 used to ensure safety may be disposed opposite the inner circumferential surface of the fixing belt 310 in the heating span of each of the PTC elements 361 to 363 and 365 to 367 in addition to the PTC element 368.

A description is provided of an operation upon abnormality detection.

Figure 6A:
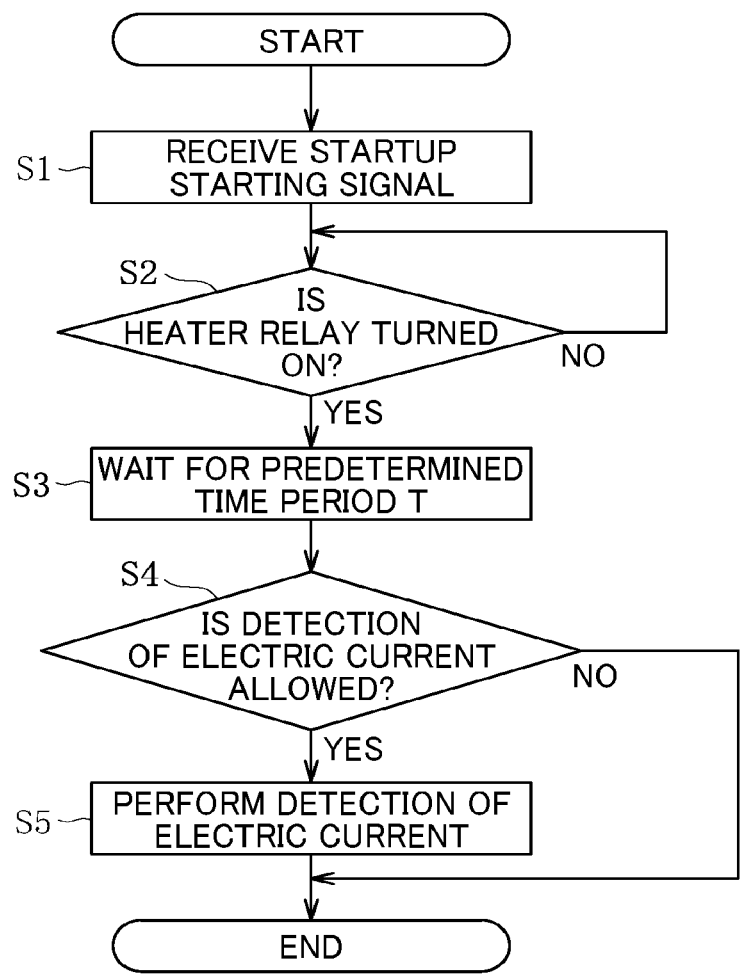
FIG. 6A is a flowchart illustrating basic control processes to control the heater depicted in FIG. 2A with an electric current detector.
Figure 6B:
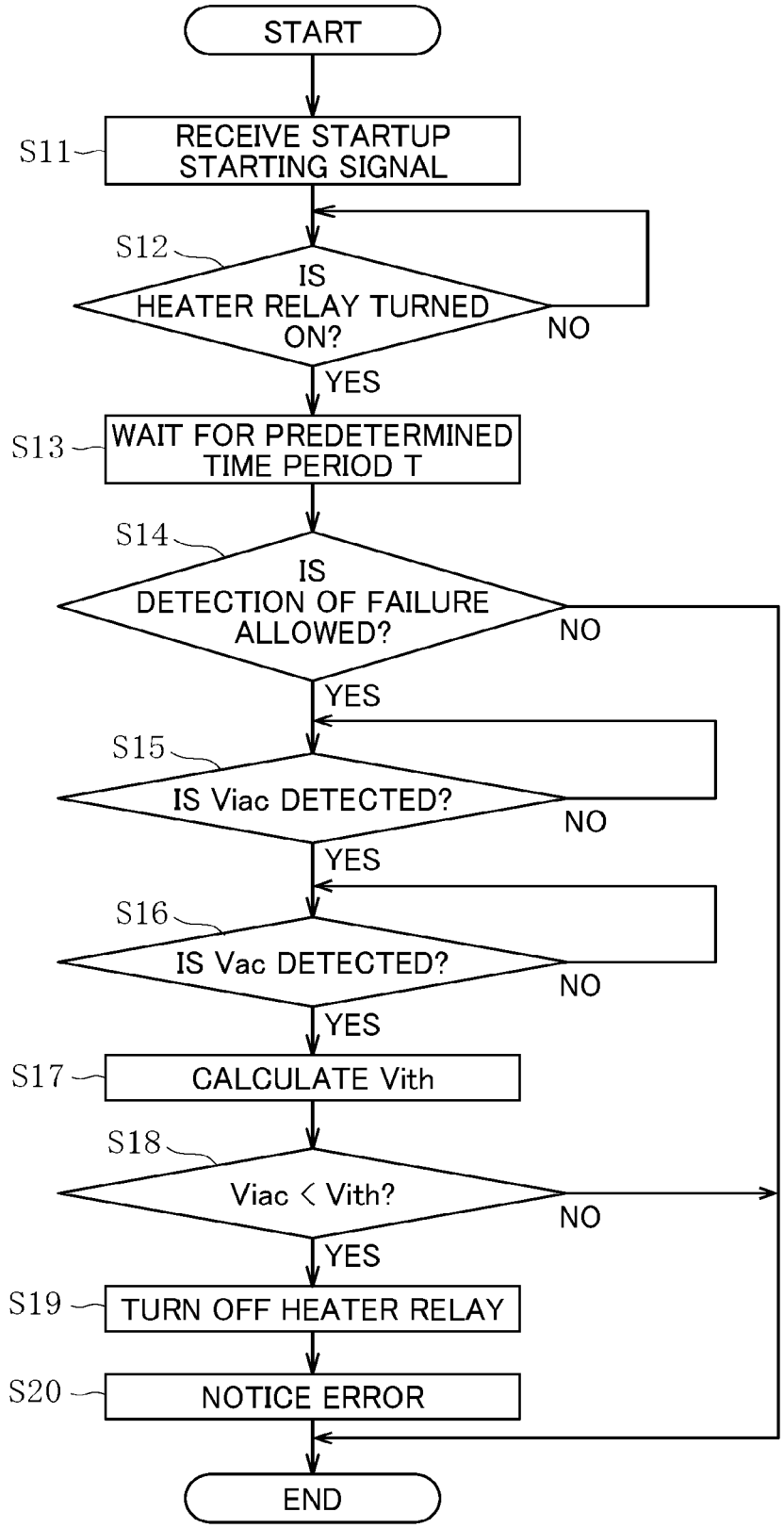
FIG. 6B is a flowchart illustrating the basic control processes in detail to control the heater depicted in FIG. 2A with the electric current detector.
Figure 6C:
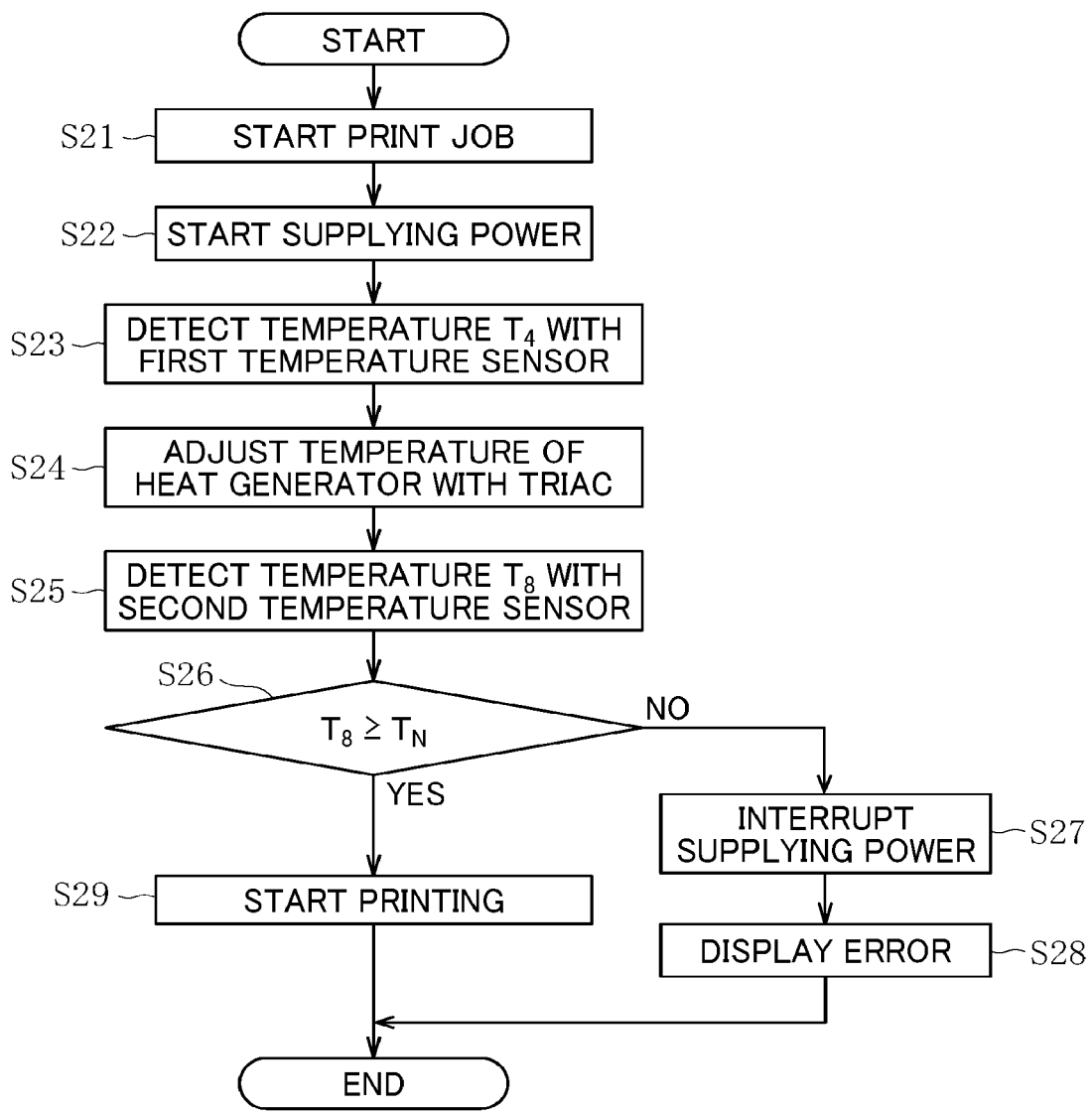
FIG. 6C is a flowchart illustrating control processes to control the heater depicted in FIG. 2A with a first temperature sensor and a second temperature sensor.

Referring to FIGS. 6A, 6B, and 6C illustrating flowcharts, a description is provided of control processes performed by the power controller 400 upon abnormality detection.

Although the description is provided with the fixing device 300 depicted in FIG. 2A, the control processes described below are also applied to the fixing devices 300S, 300T, and 300U depicted in FIGS. 2B, 2C, and 2D, respectively. FIG. 6A is a flowchart illustrating basic control processes to control the heater 91.

In step S1, the power controller 400 receives a startup starting signal that starts starting up the heater 91 or the fixing device 300. In step S2, the power controller 400 determines whether or not the heater relay 440 is turned on based on the startup starting signal. The power controller 400 reads the voltage conversion value Viac obtained by the current transformer CT of the electric current detector 430 by voltage conversion. A time to read the voltage conversion value Viac is immediately after starting up of the fixing device 300 starts.

In step S3, the power controller 400 waits for a predetermined time period T [ms]. For example, the time immediately after starting up of the fixing device 300 starts is preferably a time when the predetermined time period T [ms] has elapsed after the heater relay 440 is turned on like step S2. It is because, due to a property of a circuit of the electric current detector 430, it takes the predetermined time period T [ms] before the current transformer CT converts the electric current value into the voltage value and detects the electric current stably.

After the predetermined time period T [ms] elapses, the power controller 400 determines whether or not detection of the electric current is allowed in step S4. If the power controller 400 determines that detection of the electric current is allowed (YES in step S4), the power controller 400 performs detection of the electric current, that is, the power controller 400 reads the voltage conversion value Viac in step S5. When the power controller 400 reads the voltage conversion value Viac, the power controller 400 preferably performs calculation in view of affection of noise picked up while detecting the electric current, for example, by performing sampling for detecting the electric current for a plurality of times within a predetermined time period and excluding a maximum value and a minimum value of a plurality of electric current values obtained by detection for the plurality of times. If the power controller 400 determines that detection of the electric current is not allowed (NO in step S4), the control processes finish.

If the sampling for detecting the electric current is performed for the plurality of times within the predetermined time period when starting up the fixing device 300, as illustrated in FIG. 5B, the electric current is detected most precisely at the duty cycle of 100%. At the duty cycle of 75%, for example, the electric current value decreases at constant intervals. Accordingly, a time period for detecting the electric current is not lengthened, causing the electric current detector 430 to be susceptible to noise. Conversely, if the electric current is detected at the duty cycle of 100% when starting up the fixing device 300, the power controller 400 determines whether or not abnormality occurs before a sheet P is conveyed to the fixing nip SN, preventing faulty fixing and faulty printing advantageously.

However, even if the duty cycle is smaller than 100%, if a constant duty cycle continues for the predetermined time period while the electric current is detected, the power controller 400 also predicts an amount of decrease in the electric current value described above under duty control. Accordingly, after the fixing device 300 is started up, even in a state in which the temperature of the PTC elements 361 to 368 increases in a certain degree, the electric current is detected.

A solid line in FIG. 5C indicates a target correlation between the electric current and the voltage of the PTC elements 361 to 368. Dotted lines above and below the solid line indicate correlations between the electric current and the voltage at a lower limit of resistance and an upper limit of resistance, respectively.

As described above, in a state in which the temperature of the PTC elements 361 to 368 increases in a certain degree, the temperature of the PTC elements 361 to 368 is stabilized. Accordingly, the correlations between the electric current and the voltage are stabilized linearly as illustrated in FIG. 5C. Consequently, an electric current value Iac that flows through the PTC elements 361 to 368 is detected readily with the stabilized correlations. In this case also, the electric current detector 430 preferably detects the electric current value Iac that flows through the PTC elements 361 to 368 before conveyance of a sheet P to the fixing device 300 starts so that the power controller 400 determines whether or not abnormality occurs.

FIG. 6B is a flowchart illustrating the basic control processes in detail to control the heater 91. FIG. 6B illustrates steps S15 to S18 as an example of step S5 in FIG. 6A for performing detection of the electric current. Hence, steps S11 to S13 depicted in FIG. 6B are equivalent to steps S1 to S3 depicted in FIG. 6A. In step S14, the power controller 400 determines whether or not detection of failure is allowed If the power controller 400 determines that detection of failure is not allowed (NO in step S14), the control processes finish.

If the power controller 400 determines that detection of failure is allowed (YES in step S14), the power controller 400 determines whether or not the electric current detector 430 detects the voltage conversion value Viac obtained by converting the electric current value Iac that flows through the PTC elements 361 to 368 between the electrodes 360c and 360d into a voltage in step S15. If the power controller 400 determines that the electric current detector 430 detects the voltage conversion value Viac (YES in step S15), the power controller 400 reads and determines the voltage conversion value Viac. In step S16, the power controller 400 determines whether or not the voltage detector 450 detects a voltage value Vac between the electrodes 360c and 360d. If the power controller 400 determines that the voltage detector 450 detects the voltage value Vac (YES in step S16), the power controller 400 reads and determines the voltage value Vac.

Thereafter, in step S17, the power controller 400 calculates a failure threshold electric current value Ith (e.g., the threshold voltage Vith for failure). In step S18, the power controller 400 compares the voltage conversion value Viac with the threshold voltage Vith for failure. If the voltage conversion value Viac is not smaller than the threshold voltage Vith for failure (Viac≥Vith), the control processes finish.

Conversely, if the voltage conversion value Viac that is detected is smaller than the threshold voltage Vith for failure (Viac<Vith) (YES in step S18), the power controller 400 determines that one of the PTC elements 361 to 368 suffers from failure, for example, disconnection. Accordingly, the power controller 400 turns off the heater relay 440 in step S19 and causes a control panel of the image forming apparatus 100 to display an error to notice the error to the user in step S20.

If the power controller 400 interrupts supplying power while the sheet P is conveyed through the fixing device 300 and at the same time interrupts rotation of the sheet feeding roller 60 and the like, the sheet P is jammed. Conversely, if the power controller 400 continues rotation of the sheet feeding roller 60 and the like, faulty fixing increases. To address those circumstances, the power controller 400 preferably notices the error to the user and continues rotation of the sheet feeding roller 60 and the like unless disconnection of a part of the PTC elements 361 to 368 adversely affects substantially, for example, to safety, printing upon reception by facsimile, and the like.

The voltage detector 450 detects the voltage value Vac between the electrodes 360c and 360d separately because the voltage value Vac applied between the electrodes 360c and 360d substantially affects the electric current value Iac that flows between the electrodes 360c and 360d as illustrated in FIG. 5B. Hence, the power controller 400 corrects the failure threshold electric current value Ith (e.g., the threshold voltage Vith for failure) depending on an amount of the voltage value Vac that is detected.

As illustrated in the dotted lines indicating the lower limit of resistance and the upper limit of resistance in FIG. 5C, a total resistance value between the electrodes 360c and 360d connected to the PTC elements 361 to 368 also varies in a range of from about plus-minus 5% to about plus-minus 10% depending on variation in manufacturing of the PTC elements 361 to 368. To address the variation in manufacturing, the power controller 400 may correct the failure threshold electric current value Ith (e.g., the threshold voltage Vith for failure) based on the voltage value Vac.

According to this embodiment, the power controller 400 does not correct the failure threshold electric current value Ith (e.g., the threshold voltage Vith for failure) when an allowable variation threshold of the voltage value Vac is in a range of plus-minus 5%, for example. If the allowable variation threshold exceeds plus-minus 5%, the power controller 400 corrects the failure threshold electric current value Ith (e.g., the threshold voltage Vith for failure). For example, when the power controller 400 compares the voltage conversion value Viac with the threshold voltage Vith for failure in step S18 as described above, the power controller 400 increases or decreases the threshold voltage Vith for failure according to a variation rate in percentage of the voltage value Vac.

FIG. 6C is a flowchart illustrating the control processes to control the heater 91 with the first temperature sensor TH1 and the second temperature sensor TH2. As illustrated in FIG. 6C, in step S21, the image forming apparatus 100 receives an instruction to perform a print job.

In step S22, the power controller 400 causes the alternating current power supply 410 to start supplying power to each of the PTC elements 361 to 368 of the heat generator 360. In step S23, the first temperature sensor TH1 detects the temperature $T_4$ of the PTC element 364 situated in a center span of the heat generator 360 in the longitudinal direction thereof as illustrated in FIG. 4.

Subsequently, in step S24, the power controller 400 controls the triac 420 to start adjusting the temperature of the heat generator 360. In step S25, the second temperature sensor TH2 detects the temperature $T_8$ of the PTC element 368.

In step S26, the power controller 400 determines whether or not the temperature $T_8$ is a predetermined temperature $T_N$ or higher. If the power controller 400 determines that the temperature $T_8$ is lower than the predetermined temperature $T_N$ (NO in step S26), the power controller 400 determines that an abnormally decreased temperature (e.g., disconnection) occurs and controls the triac 420 to practically interrupt supplying power to the heat generator 360 in step S27. In step S28, the power controller 400 causes the control panel of the image forming apparatus 100 to display an error. If the power controller 400 determines that the temperature $T_8$ detected by the second temperature sensor TH2 is an abnormally increased temperature also, the power controller 400 may control the triac 420 to interrupt supplying power to the heat generator 360 similarly.

If the power controller 400 determines that the temperature $T_8$ is the predetermined temperature $T_N$ or higher (YES in step S26), the power controller 400 determines that no abnormally decreased temperature occurs and starts printing in step S29. As described above, in addition to the control processes performed with the electric current detector 430, which are illustrated in the flowcharts depicted in FIGS. 6A and 6B, the power controller 400 performs the control processes performed with the second temperature sensor TH2, which are illustrated in the flowchart depicted in FIG. 6C, improving safety of the heater 91 and the fixing device 300.

A description is provided of a power duty cycle for adjustment.

Figure 6D:
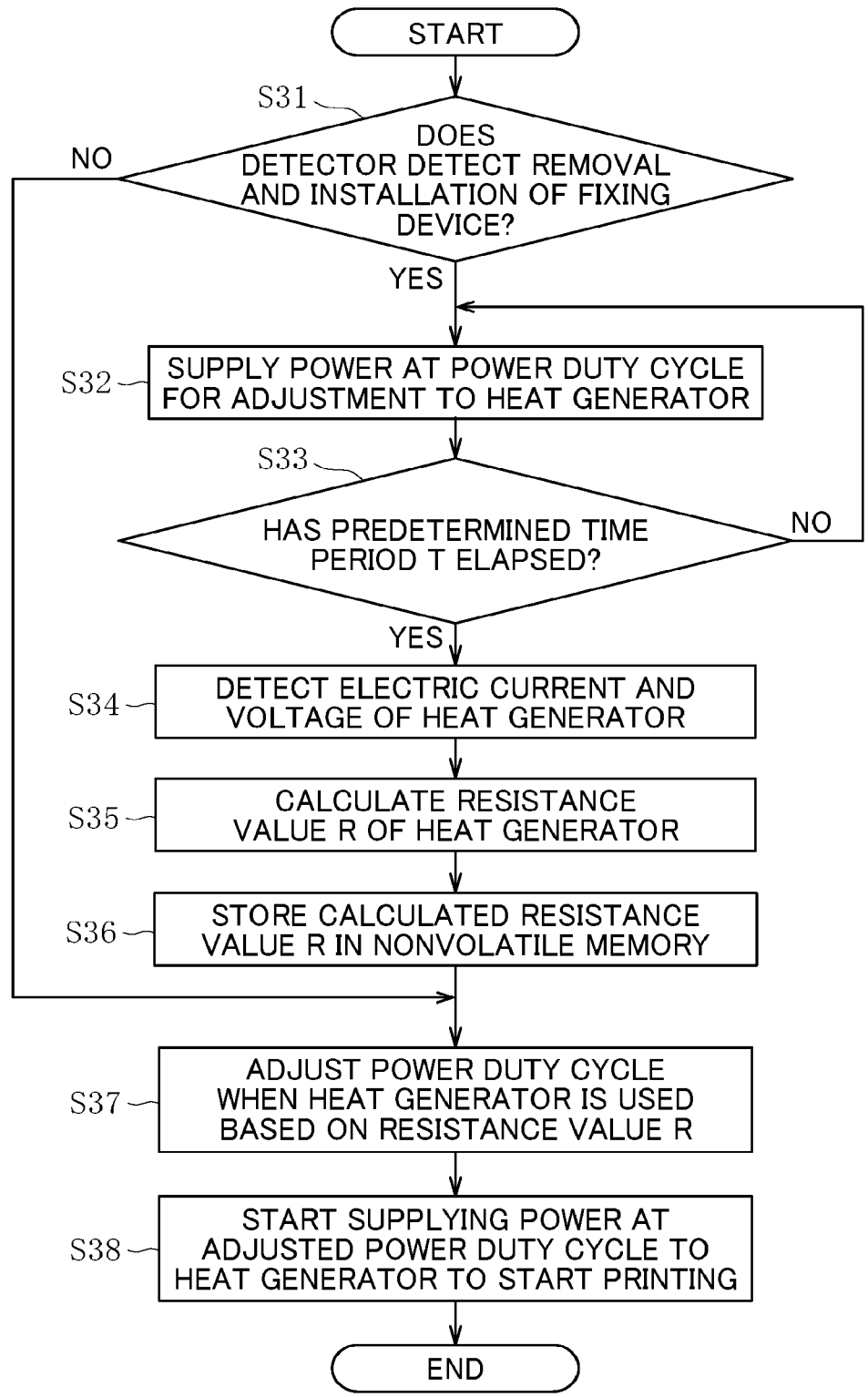
FIG. 6D is a flowchart illustrating control processes performed by the power controller after detecting removal and installation of the fixing device depicted in FIG. 2A.

FIG. 6D is a flowchart illustrating control processes performed by the power controller 400 serving as a power control member after the power controller 400 detects removal and installation of the fixing device 300. In step S31, the power controller 400 determines whether or not the detector 460 depicted in FIG. 1C detects removal and installation of the fixing device 300. If the power controller 400 determines that the detector 460 detects removal and installation of the fixing device 300 (YES in step S31), the power controller 400 supplies power at a power duty cycle for adjustment to the heat generator 360 in step S32. The power duty cycle for adjustment defines a power duty cycle of 100% that continues for a predetermine time period. It is intended to decrease detection errors because, when the electric current detector 430 and the voltage detector 450 detect the electric current and the voltage of the heat generator 360, respectively, in step S34 as described below, it takes a time period in a range of from about 300 msec to about 1,000 msec before the electric current and the voltage of the heat generator 360 are detected stably.

A predetermined power duty cycle for adjustment may be a power duty cycle that is constant or patterned. For example, the power duty cycle that is patterned may be a repeated combination of duty cycles of 100%, 50%, and 75%. Preferably, the power duty cycle that is constant is 100%.

In step S33, the power controller 400 determines whether or not a predetermine time period T has elapsed after the power controller 400 starts supplying power at the power duty cycle for adjustment. If the power controller 400 determines that the predetermine time period T has elapsed after the power controller 400 starts supplying power at the power duty cycle for adjustment (YES in step S33), the electric current detector 430 and the voltage detector 450 detect the electric current and the voltage of the heat generator 360, respectively, in step S34. If the power duty cycle is smaller than 100%, for example, 20% to 50%, the predetermine time period T is longer than that for the duty cycle of 100% under which the fixing device 300 starts up usually. When the duty cycle is smaller, the temperature of the heat generator 360 increases slowly. Accordingly, it takes longer to detect the electric current and the voltage stably with the smaller duty cycle compared to the duty cycle of 100%.

Thereafter, in step S35, the power controller 400 calculates the resistance value R of the heat generator 360 based on the electric current value I and the voltage value E that are detected (R=E/I). In step S36, a nonvolatile memory 401 inside the power controller 400 stores the calculated resistance value R. Thus, the resistance value R of the heat generator 360 is linked with the image forming apparatus 100.

Subsequently, in step S37, the power controller 400 adjusts the power duty cycle when the heat generator 360 is used based on the resistance value R. For example, if the calculated resistance value R is smaller than a design resistance value of the heat generator 360, even if power at an intended power duty cycle is supplied, a design power (e.g., a heat generating amount per unit time) is not obtained. Therefore, the power duty cycle is adjusted to be greater than the intended power duty cycle.

Conversely, if the calculated resistance value R is greater than the design resistance value of the heat generator 360, when power at the intended power duty cycle is supplied, an excessive power greater than the design power (e.g., the heat generating amount per unit time) is obtained. Therefore, the power duty cycle is adjusted to be smaller than the intended power duty cycle. After the power duty cycle is adjusted as described above, the power controller 400 starts printing, that is, starts supplying power at the adjusted power duty cycle to the heat generator 360, in step S38. When restarting printing after finishing printing, if the fixing device 300 is not removed and installed, the power controller 400 retrieves the resistance value R detected with the previous power duty cycle for adjustment and stored in the nonvolatile memory 401. The power controller 400 adjusts the power duty cycle when the heat generator 360 is used based on the resistance value R.

Instead of calculating the resistance value of the resistive heat generator by using the power duty cycle for adjustment, the fixing device 300 may be installed with a chip that stores information about the resistive heat generator in advance and the image forming apparatus 100 may retrieve the information based on which the power controller 400 adjusts the power duty cycle when the resistive heat generator is used.

As described above, the power controller 400 calculates the actual resistance value R of the heat generator 360 and adjusts the power duty cycle to obtain a desired power (e.g., the heat generating amount), thus supplying power at the power duty cycle to the heat generator 360. Accordingly, the power controller 400 properly controls power supplied to the heat generator 360 regardless of variation in manufacturing in the total resistance value of the heat generator 360.

A description is provided of measurement and determination of the power duty cycle.

Figure 7:
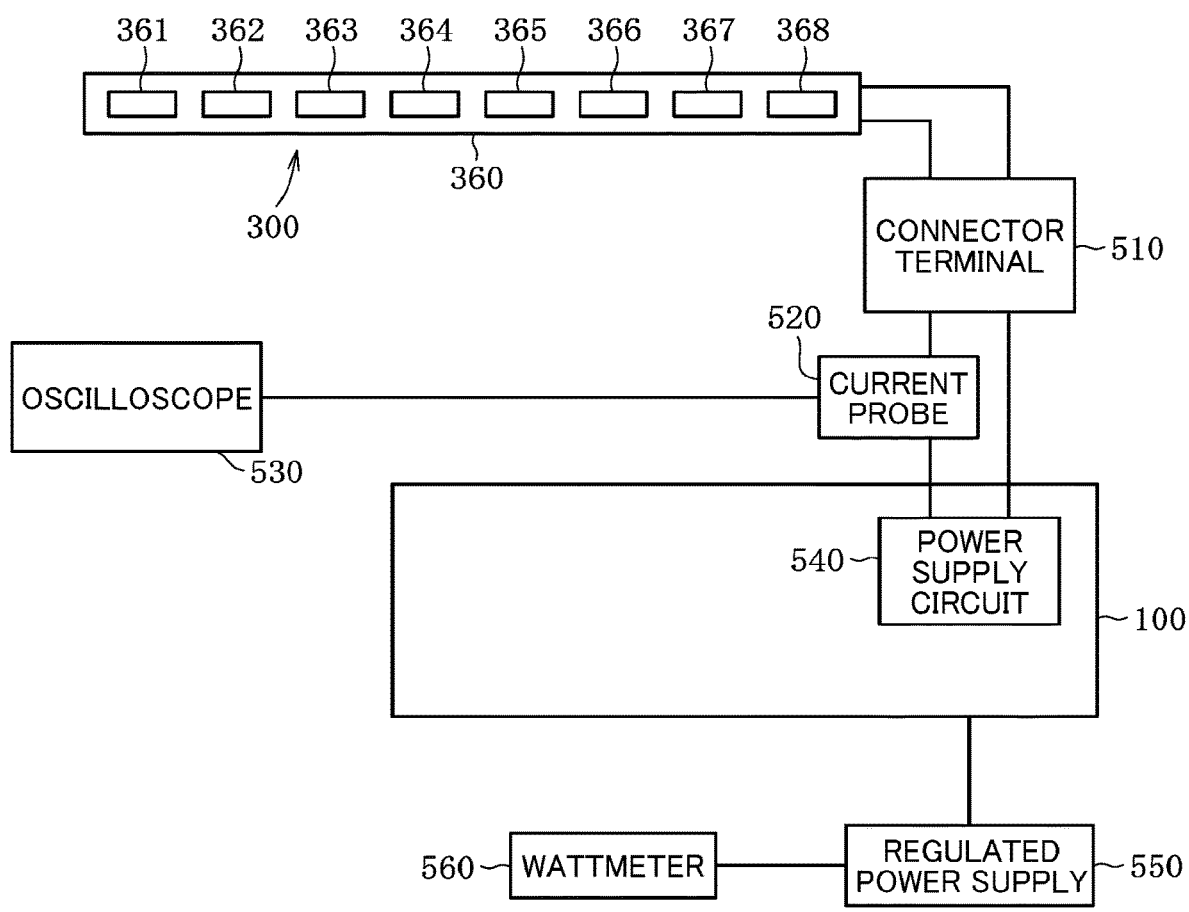
FIG. 7 is a diagram illustrating a configuration that measures a power duty cycle with the image forming apparatus depicted in FIG. 1A.

Referring to FIG. 7, a description is provided of a method for measuring the magnitude of the power duty cycle and determining the difference of the power duty cycle.

A description is provided of measurement of the resistance value of a resistive heat generator.

As a first step, the resistance of the resistive heat generator (e.g., the heat generator 360 including the PTC elements 361 to 368 depicted in FIG. 7) of the fixing device 300 is measured.

As a second step, a digital multimeter (model 753702 available from Yokogawa Test & Measurement Corporation) contacts a connector terminal 510 connected to an electrode coupled to the resistive heat generator installed in the fixing device A to measure the resistance value of the resistive heat generator. Similarly, the resistance value of a resistive heat generator installed in the fixing device B is measured.

A description is provided of setting of a measurement circuit.

As a third step, a current probe 520 is coupled to an oscilloscope 530 (DPO4000 series available from Tektronix, Inc.) on a wire that couples the connector terminal 510 with the power supply circuit 540. The oscilloscope 530 reads an alternating current (AC) waveform.

As a fourth step, a power cable of the image forming apparatus 100 is connected to a regulated power supply 550 (model PCR4000W available from Kikusui Electronics Corp.).

As a fifth step, a wattmeter 560 (model WT332E available from Yokogawa Test & Measurement Corporation) is coupled to the regulated power supply 550.

As a sixth step, accessory software attached to the wattmeter 560 calculates an integral power amount (e.g., an integral power consumption).

A description is provided of a method for measurement.

As a seventh step, in a state in which the fixing device A is installed in the image forming apparatus 100, when the fixing device A starts up for 2 seconds under an environment of a normal temperature of 23 degrees centigrade and a humidity of 54%, the oscilloscope 530 measures a rate A of a time period for power supply per 2 seconds, which is examined.

As an eighth step, even when the fixing device A does not start up, if there is a condition in which the oscilloscope 530 measures the electric current waveform for several seconds repeatedly for five times and an identical electric current waveform appears for 2 seconds in each of the electric current waveforms that are measured, it is conceived that the electric current and the voltage are stabilized under the condition. Hence, the rate A of the time period for power supply per 2 seconds may be examined. For example, the condition appears with a power pattern with which printing is performed on a single sheet P when the image forming apparatus 100 resumes operation after a sleep mode.

As a ninth step, an integral power amount A is calculated when the fixing device A is installed in the image forming apparatus 100.

As a tenth step, the fixing device A is removed from the image forming apparatus 100. Instead of the fixing device A, the fixing device B is installed in the image forming apparatus 100. The above-described setting of the measurement circuit is performed for the fixing device B.

As an eleventh step, in a state in which the fixing device B is installed in the image forming apparatus 100, when the fixing device B starts up for 2 seconds under an environment of a normal temperature of 23 degrees centigrade and a humidity of 54%, the oscilloscope 530 measures a rate B of a time period for power supply per 2 seconds, which is examined.

As a twelfth step, the rate B of the time period for power supply per 2 seconds, that is measured in the eleventh step when the fixing device B is installed, is compared with the rate A of the time period for power supply per 2 seconds, that is measured in the seventh step when the fixing device A is installed.

As a thirteenth step, an integral power amount B is calculated when the fixing device B is installed in the image forming apparatus 100.

A description is provided of a method for determination.

As a fourteenth step, after comparison in the twelfth step, if the rate B is different from the rate A, it is determined that the power duty cycle is different between the fixing devices A and B.

As a fifteenth step, the integral power amount A measured in the ninth step when the fixing device A is installed is compared with the integral power amount B measured in the thirteenth step when the fixing device B is installed, thus determining whether or not the integral power amount A and the integral power amount B are identical. A state in which the integral power amount A and the integral power amount B are identical defines that a difference between the integral power amount A of the fixing device A and the integral power amount B of the fixing device B is within plus or minus 1%. If the integral power amount A and the integral power amount B are identical, the resistance value of the fixing device A is different from the resistance value of the fixing device B and the integral power amount A of the fixing device A is identical to the integral power amount B of the fixing device B. Hence, it is determined that the power duty cycle of the fixing device A is different from the power duty cycle of the fixing device B to correspond to the resistance values of the fixing devices A and B, respectively.

As a sixteenth step, if one of the fixing devices A and B that has a greater resistance value attains a greater rate of the time period for power supply per 2 seconds, it is determined that the one of the fixing devices A and B that has the greater resistance value has a greater power duty cycle.

If the difference in the power duty cycle causes a difference in power between the fixing devices A and B to be within plus or minus 1%, in order to prevent variation in the resistance value of the resistive heat generator between the fixing devices A and B from generating variation in power (e.g., a heater output), it is determined that the power duty cycle of the resistive heat generator is controlled according to the embodiments of the present disclosure.

The above describes the embodiments of the present disclosure. However, the technology of the present disclosure is not limited to the embodiments described above and is modified within the scope of the present disclosure. For example, the heater 91 may be applied to apparatuses and devices other than the fixing device (e.g., the fixing devices 300, 300S, 300T, and 300U), such as a dryer. Instead of the PTC element, other resistive heat generators such as a ceramic heater may be used as a resistive heat generator. The PTC elements 361 to 368 may overlap each other with an engagement or the like such as a combination of a projection and a depression and teeth of a comb, other than overlapping illustrated in FIGS. 3D, 3E, 3G, and 3H. The number of the PTC elements may be smaller or greater than eight. The PTC elements may be arranged in a plurality of columns in the short direction of the base 350.

A description is provided of advantages of the image forming apparatus 100.

As illustrated in FIGS. 1A and 4, an image forming apparatus (e.g., the image forming apparatus 100) includes a resistive heat generator (e.g., the PTC elements 361 to 368) and a power control device (e.g., the power supply circuit 540). The power control device controls power supplied to the resistive heat generator. The power control device supplies the power at a predetermined power duty cycle for adjustment to the resistive heat generator. The power control device adjusts a power duty cycle when the resistive heat generator is used.

Accordingly, the power control device properly controls the power supplied to the resistive heat generator regardless of variation in the resistance value of the resistive heat generator.

According to the embodiments described above, the fixing belt 310 serves as a fixing belt. Alternatively, a fixing film, a fixing sleeve, or the like may be used as a fixing belt. Further, the pressure roller 320 serves as a pressure rotator. Alternatively, a pressure belt or the like may be used as a pressure rotator.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus, comprising:
a resistive heat generator; and
a power control device configured to control power supplied to the resistive heat generator, wherein
in response to detecting installation of the resistive heat generator in the image forming apparatus, the power control device is further configured to supply the power at a predetermined power duty cycle for determining an adjustment to the power to be supplied to the resistive heat generator, and
the power control device is further configured to determine a new power duty cycle to be applied when the resistive heat generator is used for image formation, based on a result determined from supplying the power at the predetermined power duty cycle.

2. The image forming apparatus according to claim 1, wherein the power control device is further configured to supply the power at the predetermined power duty cycle for a predetermined time period.

3. The image forming apparatus according to claim 2, wherein the predetermined power duty cycle is constant and is a 100% duty cycle.

4. The image forming apparatus according to claim 1, wherein the power control device is further configured to determine a resistance value of the resistive heat generator by supplying the power at the predetermined power duty cycle, and determine the new power duty cycle to be applied when the resistive heat generator is used for the image formation, based on the determined resistance value.

5. The image forming apparatus according to claim 4, wherein the power control device includes:
an electric current detector, connected to the resistive heat generator, to detect an electric current that flows through the resistive heat generator; and
a voltage detector, connected to the resistive heat generator, to detect a voltage applied to the resistive heat generator, and
wherein the power control device is further configured to determine the resistance value of the resistive heat generator based on the detected electric current and the detected voltage of the power supplied at the predetermined power duty cycle.

6. The image forming apparatus according to claim 5, wherein the power control device further includes a nonvolatile memory to store the determined resistance value of the resistive heat generator, and
wherein the power control device is further configured to determine the new power duty cycle to be applied when the resistive heat generator is used for the image formation, based on the determined resistance value stored in the nonvolatile memory and the voltage detected by the voltage detector.

7. The image forming apparatus according to claim 1, further comprising another resistive heat generator,
wherein the resistive heat generator and said another resistive heat generator include a plurality of resistive elements, respectively, the plurality of resistive elements being electrically connected in parallel.

8. The image forming apparatus according to claim 1, further comprising another resistive heat generator,
wherein the resistive heat generator and said another resistive heat generator include a plurality of positive temperature coefficient (PTC) elements, respectively, the plurality of PTC elements being electrically connected in parallel.

9. An image forming apparatus, comprising:
circuitry configured to
detect installation of a resistive heat generator in the imaging forming apparatus,
in response to detecting installation of the resistive heat generator in the image forming apparatus, supply power to the resistive heat generator at a predetermined power duty cycle, and
determine a new power duty cycle to be applied when the resistive heat generator is used for image formation, based on a result determined from supplying the power at the predetermined power duty cycle.

10. An image forming apparatus in which a first fixing device including a first resistive heat generator is replaceable with a second fixing device including a second resistive heat generator, the image forming apparatus comprising:
a power supply device configured to supply power to one fixing device of the first fixing device and the second fixing device, when the one fixing device is installed in the image forming apparatus, wherein
when a first resistance value of the first resistive heat generator is greater than a second resistance value of the second resistive heat generator, the power supply device is configured to control a first power duty cycle of the power supplied when the first fixing device is installed in the image forming apparatus to be greater than a second power duty cycle of the power supplied when the second fixing device is installed in the image forming apparatus.

11. The image forming apparatus according to claim 10, wherein the power supply device is further configured to supply a first power to the first resistive heat generator when the first fixing device is installed in the image forming apparatus and a second power to the second resistive heat generator when the second fixing device is installed in the image forming apparatus, and
wherein a difference between an integral power amount of the first power and an integral power amount of the second power is within plus or minus 1%.

12. The image forming apparatus according to claim 11, wherein the power supply device is further configured to supply the first power when the first fixing device starts up and supply the second power when the second fixing device starts up.

13. The image forming apparatus according to claim 10, wherein the first fixing device further includes another first resistive heat generator, and
wherein the first resistive heat generator has a plurality of positive temperature coefficient (PTC) characteristics and said another first resistive heat generator has a plurality of PTC characteristics, respectively, the first resistive heat generator and the another first resistive heat generator being electrically connected in parallel.

14. The image foiuiing apparatus according to claim 10, wherein the second fixing device further includes another second resistive heat generator, and
wherein the second resistive heat generator and said another second resistive heat generator include a plurality of positive temperature coefficient (PTC) elements, respectively, the plurality of PTC elements being electrically connected in parallel.

* * * * *